(12) United States Patent
Shiplacoff et al.

(10) Patent No.: US 9,049,261 B2
(45) Date of Patent: Jun. 2, 2015

(54) PRIORITIZED MANAGEMENT AND PRESENTATION OF NOTIFICATIONS

(71) Applicant: Google Inc., Mountain View, CA (US)

(72) Inventors: Daniel Marc Gatan Shiplacoff, Los Altos, CA (US); Matias Gonzalo Duarte, Mountain View, CA (US); Christian Robertson, Pleasanton, CA (US); Alexander Faaborg, Mountain View, CA (US); Lee Brandon Keely, San Francisco, CA (US); Leon Hong, Mountain View, CA (US); Jens Nagel, Sunnyvale, CA (US); Peter Ng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/923,288

(22) Filed: Jun. 20, 2013

(65) Prior Publication Data
US 2013/0346882 A1 Dec. 26, 2013

Related U.S. Application Data

(60) Provisional application No. 61/664,732, filed on Jun. 26, 2012, provisional application No. 61/789,118, filed on Mar. 15, 2013.

(51) Int. Cl.
*G06F 3/033* (2013.01)
*H04L 29/06* (2006.01)
*G06F 3/0484* (2013.01)
(Continued)

(52) U.S. Cl.
CPC .......... *H04L 65/403* (2013.01); *G06F 3/04842* (2013.01); *G06F 3/0484* (2013.01); *G06F 3/0488* (2013.01); *G06F 9/4443* (2013.01);
(Continued)

(58) Field of Classification Search
CPC . G06F 3/0481; G06F 3/0482; G06F 3/04842; G06F 3/0488
USPC .......................................... 715/863, 864, 779
See application file for complete search history.

(56) References Cited

U.S. PATENT DOCUMENTS 7,243,130 B2 7/2007 Horvitz et al.
7,283,808 B2 * 10/2007 Castell et al. ................. 455/413
(Continued)

FOREIGN PATENT DOCUMENTS

EP 1947559 A1 1/2007
KR 10-2010-012678 A 12/2010
WO WO 2012/078920 A1 6/2012

OTHER PUBLICATIONS

Gumballtech, "LockInfo Pt 1/2—View Mail, SMS, Twiter, & More on Your Lockscreen," Feb. 3, 2013, retrieved from , <URL:http://www.youtube.com/watch?v=mB0OXM-wxZQ/>, 3 pp.
(Continued)

*Primary Examiner* — Rashawn Tillery
(74) *Attorney, Agent, or Firm* — Shumaker & Sieffert, P.A.

(57) ABSTRACT

A computing device is described that receives an indication of a notification, and determines a priority level associated with the notification. The computing device determines, based at least in part on the priority level, content of the notification. Responsive to receiving an indication of a gesture detected at an input device, the computing device outputs, for display, a notification center graphical user interface that includes a graphical indication of the notification including the content of the notification.

12 Claims, 9 Drawing Sheets

(51) Int. Cl.
*G06F 3/0488* (2013.01)
*G06F 3/0482* (2013.01)
*G06Q 10/10* (2012.01)
*G06F 9/44* (2006.01)

(52) U.S. Cl.
CPC ............ *G06F 3/0482* (2013.01); *G06Q 10/107* (2013.01); *G06Q 10/1095* (2013.01)

(56) References Cited

U.S. PATENT DOCUMENTS

| | | | |
|---|---|---|---|
| 7,603,379 B2 * | 10/2009 | Kang et al. | 1/1 |
| 7,614,012 B1 | 11/2009 | Dulaney | |
| 7,707,514 B2 | 4/2010 | Forstall et al. | |
| 2002/0054117 A1 * | 5/2002 | van Dantzich et al. | 345/766 |
| 2004/0061716 A1 * | 4/2004 | Cheung et al. | 345/710 |
| 2004/0103167 A1 | 5/2004 | Grooters et al. | |
| 2005/0018819 A1 * | 1/2005 | Schmidt et al. | 379/88.13 |
| 2005/0193345 A1 * | 9/2005 | Klassen et al. | 715/751 |
| 2006/0089931 A1 * | 4/2006 | Giacobbe et al. | 707/9 |
| 2006/0123360 A1 * | 6/2006 | Anwar et al. | 715/810 |
| 2007/0197195 A1 * | 8/2007 | Sugiyama et al. | 455/412.2 |
| 2008/0160960 A1 | 7/2008 | ElRif et al. | |
| 2009/0247112 A1 | 10/2009 | Lundy et al. | |
| 2009/0288009 A1 | 11/2009 | Dulaney | |
| 2009/0303257 A1 | 12/2009 | Yamaguchi | |
| 2010/0058231 A1 * | 3/2010 | Duarte et al. | 715/800 |
| 2010/0088641 A1 | 4/2010 | Choi | |
| 2010/0159994 A1 | 6/2010 | Stallings et al. | |
| 2010/0185988 A1 | 7/2010 | Park et al. | |
| 2010/0211886 A1 | 8/2010 | Forstall et al. | |
| 2010/0248688 A1 | 9/2010 | Teng et al. | |
| 2010/0281397 A1 * | 11/2010 | Buchheit et al. | 715/752 |
| 2011/0167382 A1 | 7/2011 | van Os | |
| 2011/0271230 A1 | 11/2011 | Harris et al. | |
| 2011/0298614 A1 | 12/2011 | Bells | |
| 2012/0102437 A1 | 4/2012 | Worley et al. | |
| 2012/0117507 A1 * | 5/2012 | Tseng et al. | 715/774 |
| 2012/0149342 A1 * | 6/2012 | Cohen et al. | 455/412.2 |
| 2012/0185797 A1 * | 7/2012 | Thorsen et al. | 715/784 |
| 2012/0198002 A1 * | 8/2012 | Goulart et al. | 709/206 |
| 2013/0125062 A1 * | 5/2013 | Lee et al. | 715/854 |
| 2013/0145303 A1 * | 6/2013 | Prakash et al. | 715/779 |

OTHER PUBLICATIONS

International Search Report and Written Opinion of International application No. PCT/US2013/047685, mailed Mar. 19, 2014, 12 pp.
International Preliminary Report on Patentability from International Application No. PCT/US2013/047685, dated Jan. 8, 2015, page.

* cited by examiner

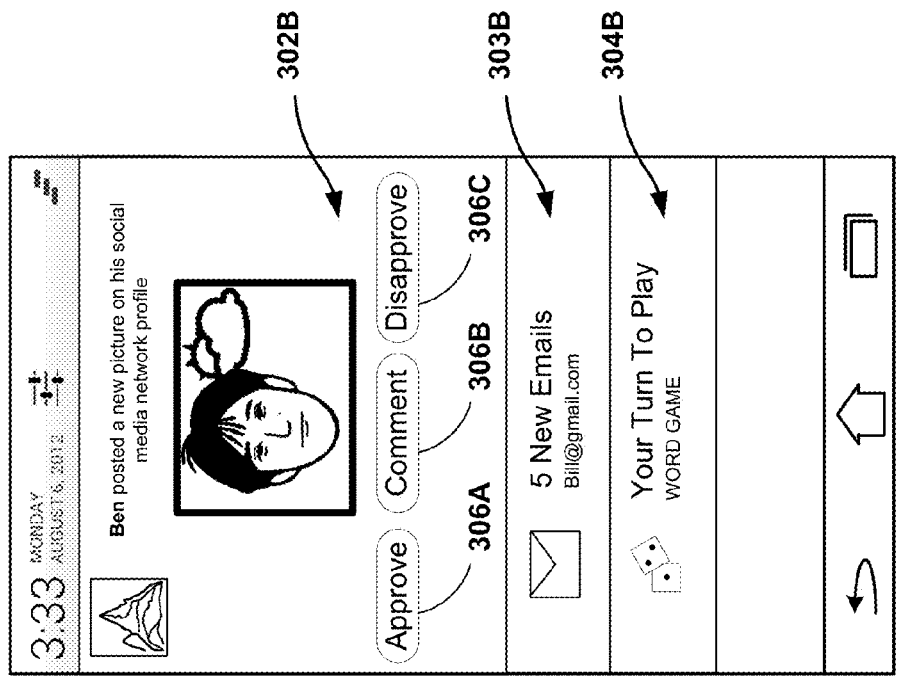
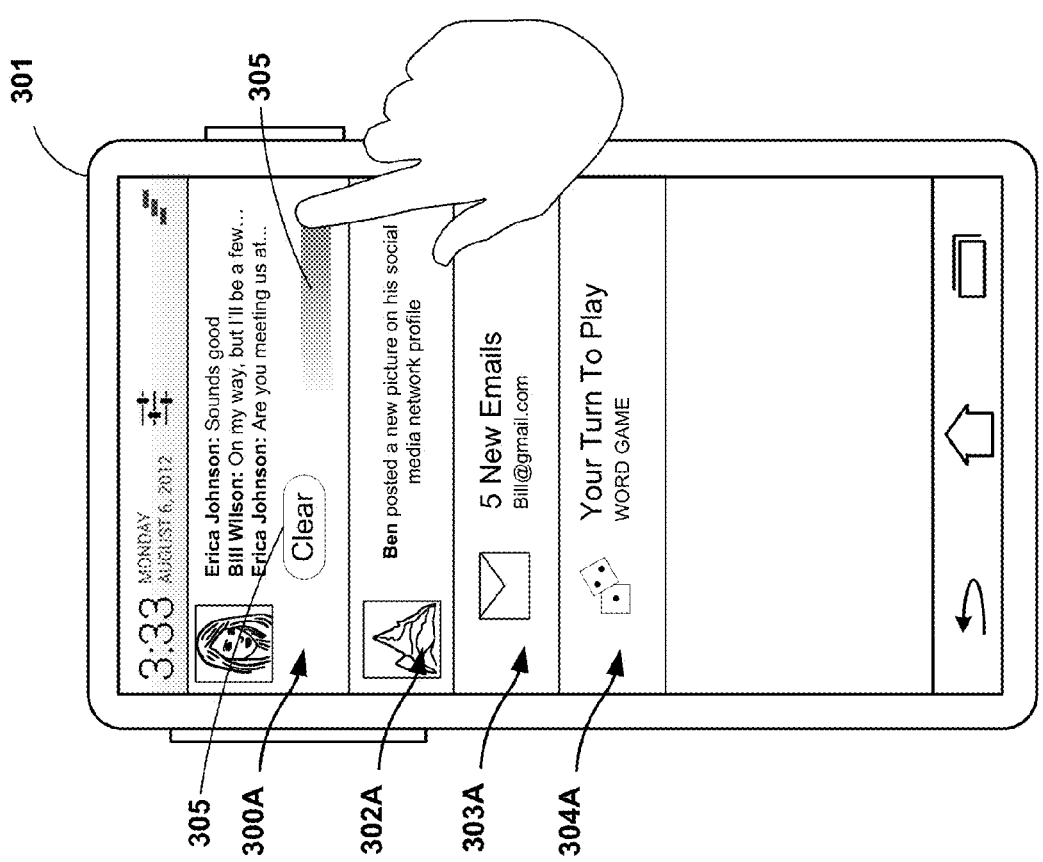
FIG. 6A
FIG. 6B

PRIORITIZED MANAGEMENT AND PRESENTATION OF NOTIFICATIONS

This application claims the benefit of U.S. Provisional Application No. 61/664,732, filed Jun. 26, 2012, and U.S. Provisional Application No. 61/789,118, filed Mar. 15, 2013, the entire content of each of which are hereby incorporated by reference.

BACKGROUND

A computing device may provide a notification module that manages information and/or alerts (e.g., notifications) received from applications executing at the computing device. In some instances, a notification module may output the important information and/or alerts for display at a screen. As the quantity of applications executing at a computing device increases, the quantity of notifications received by the computing device may increase, which may complicate the management and presentation of notifications by a notification module. For example, the quantity of notifications displayed to a user at one time may be limited by the size of a screen used to display the notifications. A limited number of notifications may be displayed at one time and the notifications may be presented in a fixed, one-size-fits-all format, unrelated to the amount of the content associated with each notification. Limiting the quantity of notifications displayed at one time may require the computing device to replace notifications that include more-important information with one or more notifications that include less-important information.

Furthermore, a computing device that uses a notification module to manage multiple notifications may require that a user provide input responsive to a particular notification generated by the notification module, but within a context outside of the user interface of the notification module itself. For example, a notification tool may receive and cause a computing device to present information about a text message notification, but require a user to exit the notification module and open a text message application in order to respond to the text message referenced in the text message notification.

SUMMARY

In one example, the disclosure is directed to a method that includes receiving, by a computing device, an indication of a notification, and determining, by the computing device, a priority level associated with the notification. The method further includes determining, by the computing device and based at least in part on the priority level, content of the notification, and responsive to receiving an indication of a gesture detected at an input device, outputting, by the computing device and for display, a notification center graphical user interface, the notification center graphical user interface including a graphical indication of the notification, the graphical indication including the content of the notification.

In another example, the disclosure is directed to a method that includes receiving, by a computing device, an indication of a first notification and an indication of a second notification, and determining, by the computing device, a respective priority level associated with each of the first and second notifications. The method further includes determining, by the computing device and based on the respective priority levels of the first and second notifications, respective content of each of the first and second notifications. The method further includes outputting, by the computing device and for display, a notification center graphical user interface including a respective graphical indication of each of the first and second notifications, the graphical indication of the first notification including the content of the first notification and the graphical indication of the second notification including the content of the second notification.

In another example, the disclosure is directed to a system including an input device, a display device, at least one processor, and at least one module operable by the at least one processor to receive an indication of a notification and determine a priority level associated with the notification. The at least one module being further operable by the at least one processor to determine, based at least in part on the priority level, content of the notification, and responsive to receiving an indication of a gesture detected at the input device, output, for display at the display device, a notification center graphical user interface, the notification center graphical user interface including a graphical indication of the notification, and the graphical indication including the content of the notification.

In another example, the disclosure is directed to a system including an input device, a display device, at least one processor, and at least one module operable by the at least one processor to receive an indication of a first notification and an indication of a second notification, and determine a respective priority level associated with each of the first and second notifications. The at least one module being further operable by the at least one processor to determine, based on the respective priority levels of the first and second notifications, respective content of each of the first and second notifications. The at least one module being further operable by the at least one processor to output, for display at the display device, a notification center graphical user interface including a respective graphical indication of each of the first and second notifications the graphical indication of the first notification including the content of the first notification and the graphical indication of the second notification including the content of the second notification.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 6A and 6B are conceptual diagrams illustrating further example graphical indications of notifications, in accordance with one or more aspects of the present disclosure.

DETAILED DESCRIPTION

Figure 1:
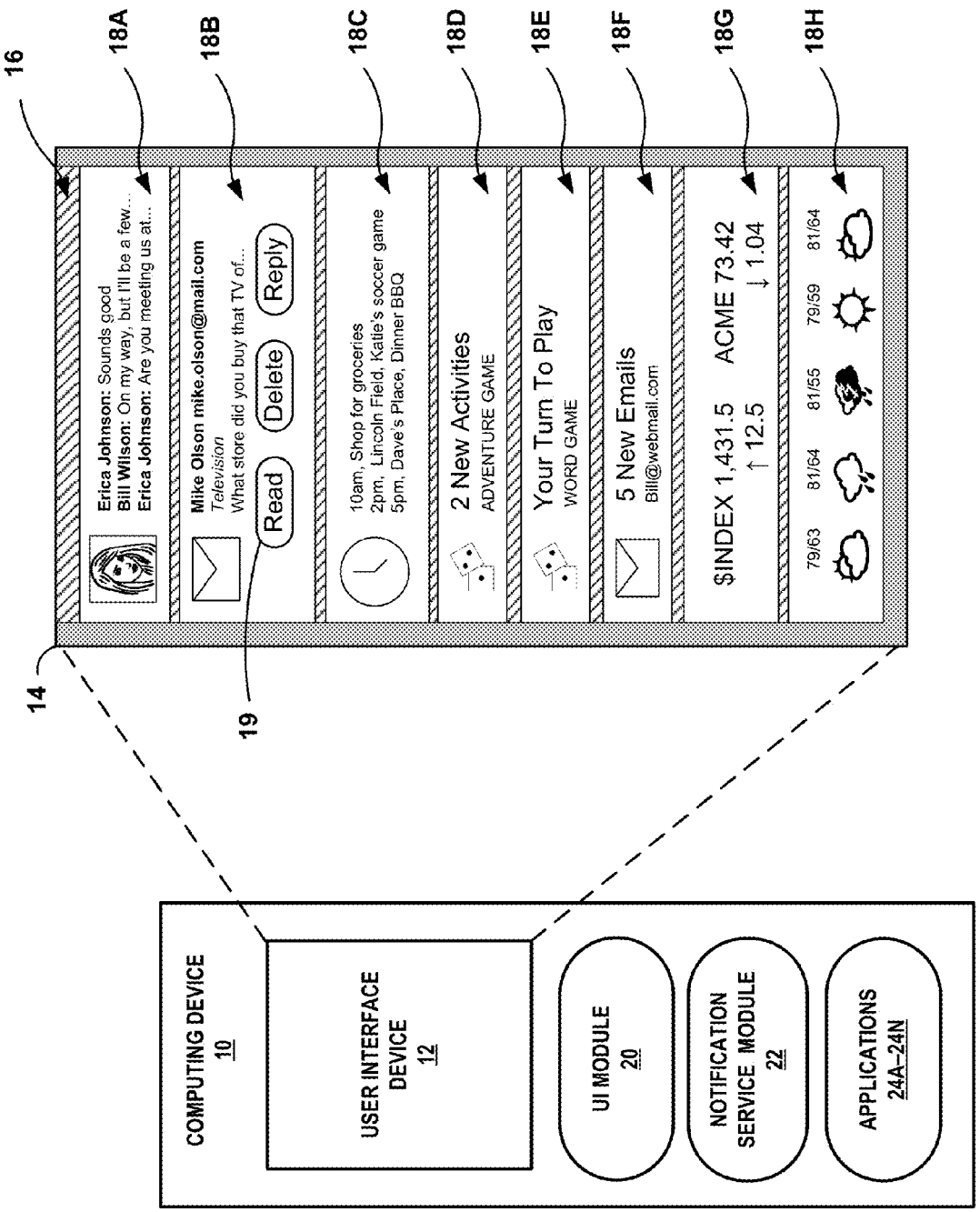
FIG. 1 is a conceptual diagram illustrating an example computing device that is configured to present notifications, in accordance with one or more aspects of the present disclosure.

Examples described in this disclosure relate to techniques applied by a computing device that receives one or more notifications and outputs, for display, graphical indications of the notifications. In some examples, the computing device includes a notification service module that manages notifications on behalf of the computing device. The notification service module may receive notifications generated by services and applications executing at the computing device and/or executing remote to the computing device. The notification service module may control the presentation of a respective graphical indication associated with each of the one or more notifications. The notification service module may include one or more of these graphical indications within a notification center graphical user interface (GUI) that the computing device outputs for display (e.g., at a display device).

Notifications may include a first content portion (e.g., a summary textual description of the notification, a graphical icon associated with the notification, etc.) and a second content portion (e.g., a complete textual description of the notification, a graphical image associated with the notification, etc.). A second content portion of a notification may include more information about the notification than the first content portion. Some notifications may include only a first content portion. In other words, those notifications with both a first content portion and a second content portion may include more information than those notifications that only include a first content portion.

In some examples, to present multiple graphical indications of notifications simultaneously within a single GUI, the notification service module may constrain the presentation of individual graphical indications of notifications by presenting only the first content portions of each notification. In other words, rather than including both first and second content portions in graphical indications of notifications that have both first and second content portions, the notification service module may only include the first content portion of within the graphical indications.

In some examples, the notification service module may determine a priority level of each notification received and modify the presentation of the notification center GUI accordingly. The computing device may automatically expand the graphical indications of higher priority notifications to include both a first content portion and a second content portion of higher priority notifications within their respective graphical indications. The computing device may automatically constrain or collapse the graphical indications of lesser priority notifications to include only a first content portion within their respective graphical indication.

In some examples, the computing device may present multiple graphical indications of multiple different notifications. One graphical indication may include first and second content portions of one notification, and at least one other graphical indication may include only a first content portion of a different notification. The computing device may receive an indication of an input to select and clear (e.g., remove from display) the one notification corresponding to the graphical indication with both the first and second content portions. In response, the computing device may clear (e.g., remove from display) the selected notification by ceasing to display the graphical indication of the selected notification. With the graphical indication of the selected notification removed, the computing device may automatically expand the graphical indication of the other notification and include the second content portion of the other notification, along with the first content portion of the other notification, within the graphical indication of the other notification.

In some examples, the computing device may receive an indication of an input that causes the computing device to expand a size of a graphical indication of a notification such that the expanded graphical indication includes additional content associated with the notification. For example, the computing device may present a notification center graphical user interface at a display device, such as a presence-sensitive screen. Within the notification center GUI, the notification service module may include a graphical indication of a notification including a first content portion. To enable selection of a notification for expansion, the computing device may detect and/or receive an indication of a gesture entered at or near a portion of a presence-sensitive input device corresponding to a location at which the graphical indication of the notification is displayed. In response to receiving an indication of the detected input, the notification service module may expand the selected graphical indication by, for example, increasing the size of the graphical indication and including a second content portion in addition to a first content portion corresponding to the notification, within the graphical indication.

In some examples, the notification service module may include one or more selectable options within a graphical indication of a notification. The options may be for configuring the notification, responding to the notification, and/or performing any other action associated with the notification. For instance, the notification service module may output one or more selectable graphical elements for display within a graphical indication of a notification. The one or more selectable graphical elements may represent options to configure, delete, clear, remove from display, reply, uninstall, block, prevent similar, or otherwise take an action with respect to the corresponding notification. A user may select one or more of these options by, for example, performing a gesture at a portion of a presence-sensitive input device corresponding to a location at which one or more of the respective graphical elements are displayed. In response to the selection, the computing device may execute the optional action associated with the selected option.

In other cases, instead of or in addition to presenting graphical elements as options, the notification service module may include a modified user interface to handle more complex user responses and interactions to notifications. For example, the notification service module may present, as a second content portion of a notification, an overlay for interacting with an application associated with the notification. Example interactions may include replying to a text or electronic mail message notification within a message GUI of the notification center GUI instead of, for example, launching the message application that generated the notification in the first place.

Techniques of this disclosure may provide one or more advantages. For example, techniques of this disclosure may provide for better management of content associated with notifications and may help ensure a user obtains sufficient information from a presentation of a notification. In addition, by varying the presentation of higher priority notifications from lower priority notifications, the computing device may present the notifications in a more useful way, which may make it easier for a user to manage notifications. Techniques of this disclosure may also enable a user to perform an action relating to a notification without requiring the computing device to launch application associated with the notification for handling the action. Furthermore, by including selectable options within the presentation of notifications, the computing device can be configured and/or customized to handle notifications in a way that is more suitable to a particular situation or use of the computing device. Better presentation, management, and customization of notifications may provide a better user experience and may require fewer inputs from a user to perform actions in response to notifications.

FIG. 1 is a conceptual diagram illustrating an example computing device that is configured to present notifications, in accordance with one or more aspects of the present disclosure. In the example of FIG. 1, computing device 10 may be a mobile phone, a tablet computer, a personal digital assistant (PDA), a laptop computer, a portable gaming device, a portable media player, an e-book reader, a watch, television platform, or other type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). The presence-sensitive screen of UID 12 may present output to a user. UID 12 may present the output as a graphical user interface (e.g., user interface 14) which may be associated with functionality provided by computing device 10. For example, UID 12 may present various user interfaces of applications 24A-24N (collectively, "applications 24") executing at computing device 10 (e.g., an electronic message application, an Internet browser application, etc.). A user may interact with a respective user interface of each of applications 24 to cause computing device 10 to perform operations relating to a function.

Computing device 10 may include user interface ("UI") module 20, notification service module 22, and applications 24. Modules 20, 22, and applications 24 may perform operations described using software, hardware, firmware, or a mixture of hardware, software, and firmware residing in and/or executing at computing device 10. Computing device 10 may execute modules 20, 22, and applications 24, with multiple processors. Computing device 10 may execute modules 20, 22, and applications 24 as a virtual machine executing on underlying hardware. Modules 20, 22, and applications 24 may execute as a service of an operating system or computing platform. Modules 20, 22, and applications 24 may execute as one or more executable programs at an application layer of a computing platform.

Applications 24 of computing device 10 may perform various functions or access one or more services for computing device 10. An e-mail application, a calendar application, a text message application, a game application, a stock application, and a weather application are all examples of applications 24. For example, application 24A may be a text messaging application that provides functionality associated with viewing, editing, sending, and receiving text messages with computing device 10. Application 24A may be an e-mail application that provides functionality associated with viewing, editing, sending, and receiving e-mail messages with computing device 10. Application 24A may be a calendar application that provides functionality for computing device 10 to schedule and present appointments, meetings, and the like associated with an electronic calendar. Applications 24A may be game applications that provide gaming functionality for computing device 10. Application 24A may be a stock application that provides functionality for downloading and presenting financial and other stock related information from the Internet. Application 24A may be a weather application that provides functionality for presenting online weather forecasts and other metrological information.

UI module 20 may cause UID 12 to present user interface 14. User interface 14 includes graphical elements (e.g., indications) displayed at various locations of UID 12. FIG. 1 illustrates a notification center 16 which presents individual graphical indications of notifications 18A-18H (collectively, "notifications 18"). Each of notifications 18 may correspond to and be generated by one of applications 24. In other words, one or more applications 24 may generate the notification information (e.g., content) corresponding to a respective graphical indication of notifications 18 and presented within notification center 16 by UI module 20 at UID 12.

In the example of FIG. 1, notification center 16 presents a graphical indication of text message notification 18A that shows a preview of the last three text messages exchanged with a particular contact, as well as the sender of each message and a small image of the contact. Text message notification 18A may be generated by a text message application. Notification center 16 presents an expanded graphical indication of e-mail message notification 18B that shows a preview a new unread email received by an e-mail application. The graphical indication of notification 18B also includes the name of the sender, the subject, and the first words of the e-mail. The graphical indication of notification 18B also includes selectable graphical element 19 that indicates one or more optional actions associated with notification 18B. For example, selectable graphical element 19 corresponds to an option to view (e.g., read) the e-mail message received by the e-mail application.

Notification center 16 presents an unexpanded graphical indication of e-mail notification 18F which is similar to the graphical indication of notification 18B, however the graphical indication of notification 18F only shows a quantity of unread e-mails received by an e-mail application rather than shows a preview a new unread email. In other words, notification 18F may include a plurality of individual e-mail notifications and the graphical indication of notification 18F may include content corresponding to the plurality of individual e-mail notifications. When UID 12 presents the unexpanded graphical indication of e-mail notification 18F, the unexpanded graphical indication of e-mail notification 18F may be smaller in size than the expanded graphical indication of e-mail notification 18B. In other words, the graphical indication of notification 18F may be presented by UID 12 in less screen space than the graphical indication of notification 18B. In some examples, a greater maximum quantity of unexpanded graphical indications of notifications can be presented by UID 12 than a maximum quantity of expanded graphical indications of notifications.

In some examples, notification 18B and notification 18F may correspond to different e-mail message accounts. For instance, notification 18B may correspond to a notification from an e-mail application associated with a work e-mail account and notification 18F may correspond to a notification from the e-mail application associated with a personal e-mail account. The unexpanded graphical indication of e-mail notification 18F, in addition to presenting a quantity of unread e-mail messages, may also present an indication of the e-mail account associated with notification 18F.

In some examples, the unexpanded graphical indication of e-mail notification 18F may include lower priority emails (e.g., as determined based on sender, subject, email account, etc.) than the emails that triggered the generation and display of the expanded graphical indication of e-mail notification 18B. For example, an e-mail application may generate a high priority level email notification 18B in response to receiving an e-mail from a user recipient's supervisor, spouse, important friend, and the like, whereas a different e-mail application may generate a low priority level e-mail notification 18F in response to receiving corporate advertising, promotional, and/or spam e-mails.

Notification center 16 further presents a graphical indication of calendar notification 18C which reflects notifications provided by a calendar application, including the next three calendar events for a given day. Notification center 16 presents graphical indications of notifications 18D and 18E, which show information corresponding to the status of games associated with game applications. Notification center 16 presents graphical indications of notification 18G and 18H which show stock market and weather information corresponding notifications generated by a stock market application and a weather application respectively.

Notification service module 22 may execute as an executable application at computing device 10 and/or as a service of, for example, an operating system or computing platform of computing device 10. Notification service module 22 may perform functions associated with receiving, managing, and otherwise handling some, or all, of notifications 18, that are generated by applications 24 and/or received by computing device 10 from services and applications executing remote to computing device 10 (e.g., at server, at a network cloud, etc.). For example, when application 24A generates notification 18A, rather than immediately presenting a graphical indication of notification 18A at UID 12, notification service module 22 may receive notification 18A from application 24A and determine a graphical indication of notification 18A. In some examples, notification service module 22 may include the graphical indication of notification 18A within notification center 16. In other examples, notification service module 22 may determine to ignore or otherwise cause computing device 10 to suppress notification 18A from alerting a user.

In addition to handling notifications 18, notification service module 22 may send information and commands to UI module 20 that cause computing device 10 to present notification center 16. For instance, notification service module 22 may send information about the graphical layout of notification center 16 including information about each of the graphical indications of notifications 18. UI module 20 may convert the graphical layout of notification center 16 into a format recognized by UID 12 for presenting notification center 16. Notification service module 22 may further interpret inputs received by computing device 10 when UID 12 presents notification center 16. For instance, UID 12 may detect an input (e.g., a gesture) at or near a location at which UID 12 presents the graphical indication of notification 18C. UI module 20 may receive an indication of the detected input from UID 12 and send information generated based on the indication to notification service module 22. Notification service module 22 may process the information about the input and determine one or more changes to make to the visual layout of notification center 16 (e.g., removing, expanding, collapsing, etc., one or more of the graphical indications of notifications 18).

UI module 20 may act as an intermediary between various components of computing device 10 to make determinations based on input detected by UID 12 and to generate output presented by UID 12. For instance, UI module 20 may receive, as an input from notification service module 22, graphical information that indicates the layout of notification center 16 and cause UID 12 to output the layout. UI module 20 may receive information from UID 12 about input detected by UID 12 and transmit the input information to notification service module 22 when the information about the input relates to the layout of notification center 16. In cases when the input information does not relate to the layout of notification center 16, UI module 20 may refrain from transmitting the input information to notification service module 22.

In the example of FIG. 1, computing device 10 may output, for display, a graphical indication of a notification. In various instances, the notification may be associated with at least one application executing at computing device 10. In other instances, the notification may be associated with at least one application and/or service executing at one or more computing devices remote from computing device 10. The graphical indication of the notification may include one or more selectable graphical elements indicating one or more respective optional actions associated with the notification.

For example, an e-mail application may receive a new e-mail message. To notify a user of computing device 10 of the receipt of the new e-mail message, the e-mail application may generate and send notification 18B to notification service module 22. Notification 18B may include content associated with the new e-mail message. For instance, the content of notification 18B may include a first content portion, such as an indication of the name of the e-mail account associated with the new e-mail message. The content of notification 18B may also include a second content portion, such as the name of the sender, the subject, and the first few words of the e-mail message.

Notification service module 22 may receive notification 18B from the e-mail application and generate a graphical indication of notification 18B including one or more selectable graphical elements 19 that indicate respective optional actions associated with the notification. That is, the graphical indication of notification 18B may include one or more graphical buttons, such as selectable graphical element 19. Notification service module 22 may cause computing device 10 to present the entire body of the e-mail message corresponding to notification 18B in response to a selection of selectable graphical element 19.

Notification service module 22 may send information of the graphical indication of notification 18B to UI module 20 along with instructions for presenting the graphical indication and selectable graphical element 19 within notification center 16. UI module 20 may receive the graphical indication and the instructions from notification service module 22 and cause UID 12 display the graphical indication.

Computing device 10 may receive an indication of an input detected at a presence-sensitive input device, the input corresponding to a selection of the selectable graphical element. For example, a user may perform a gesture with one or more fingers, stylus, pen, or other input device at a location of UID 12 corresponding to where UID 12 presents selectable graphical element 19. UI module 20 may receive information about the input from UID 12 and determine the input occurred at a location corresponding to where UID 12 presents selectable graphical element 19.

UI module 20 may send information about the input (e.g., information about one or more gesture events) to notification service module 22. Notification service module 22 may determine, based on the information from UI module 20, that the input represents an input from a user to select selectable graphical element 19.

Responsive to receiving the indication of the input, computing device 10 may execute the optional action associated with the notification. Notification service module 22 may cause computing device 10 to execute the e-mail application that generated notification 18B, and in the execution of the e-mail application, present the body of e-mail at UID 12. For example, notification service module 22 may cause computing device 10 to execute a process of the e-mail application for viewing the e-mail associated with notification 18B. The e-mail application may cause UI module 20 and UID 12 to present the e-mail corresponding to notification 18B.

Computing device 10 may output, for display, a respective graphical indication of each notification of a plurality of notifications 18. The respective graphical indication of a first notification of the plurality of notifications 18 may include both a first content portion and a second content portion and the respective graphical indication of a second notification of the plurality of notifications 18 may include only a first content portion corresponding to the second notification. For example, notification service module 22 may receive notifications 18B and 18F from an e-mail application. As shown in FIG. 1, the graphical indication of notification 18B (e.g., a first notification) includes both a first content portion of an e-mail notification received by the e-mail application (e.g., the name and e-mail address of the sender of an e-mail, an envelope e-mail icon, etc.) and a second content portion of the e-mail notification (e.g., the subject of the e-mail, the first few words of the message, selectable graphical element 19, etc.). The graphical indication of notification 18F (e.g., a second notification) includes only a first content portion of an e-mail notification received by the e-mail application (e.g., an indication of a quantity of unread e-mail messages received by the e-mail application, an e-mail address associated with the e-mail account that received the e-mail messages). Notification service module 22 may command UI module 20 to cause UID 12 to present the graphical indications of notifications 18F and 18B.

Computing device 10 may receive an indication of an input detected at a presence-sensitive input device, the input corresponding to a command to remove (e.g., clear) the first notification from display. For instance, a user of computing device 10 may view the graphical representation of notification 18B and decide to remove the graphical indication from display. That is, the user may wish to remove the graphical indication of notification 18B from notification center 16. The user may provide a gesture at a location of UID 12 corresponding to where UID 12 presents the graphical indication of notification 18B.

Responsive to receiving the indication of the input, computing device 10 may cease outputting for display, the respective graphical indication of the first notification. For example, UI module 20 may receive information about the input detected by UID 12 and determine the location of the input approximately corresponds to a location of UID 12 where UID 12 presents the graphical indication of notification 18B. UI module 20 may send information about the input and including an indication about where the input was received relative to where the graphical indication of notification 18B is presented. Notification service module 22 may determine, based at least in part on the input, to modify the graphical layout of notification center 16 to remove the graphical indication of notification 18B.

Responsive to receiving the indication of the input, computing device 10 may output the respective graphical indication of the second notification to include a second content portion in addition to the first content portion. In other words, in addition to removing the graphical indication of notification 18B from the graphical layout of notification center 16, notification service module 22 may output the graphical indication of notification 18F (e.g., by automatically expanding the graphical indication) to include a second content portion in addition to the first content portion. The second content portion may include more information than just the quantity of new e-mail messages corresponding to notification 18F. For instance, the second content portion may include more information that indicates the sender and subject of each of the new e-mail messages indicated by the first content portion. In other words, notification service module 22 may display a first graphical indication of a notification in an expanded state with both first and second content portions and a second graphical indication in an unexpanded state with just a first content portion. After removing the first graphical indication from display (e.g., clearing the first notification), notification service module 22 may automatically expand the second graphical indication and include a second content portion along with the first content portion.

Notification service module 22 may output the modified layout of notification center 16, to UI module 20. In response to the modified layout, UI module 20 may cause UID 12 to present the modified notification center 16.

Computing device 10 may receive a notification (or an indication of a notification, such as information that indicates to notification service module 22 that an application has generated a notification), and determine a priority level associated with the notification. Computing device 10 may determine appropriate content corresponding to the notification to include in a graphical indication of the notification based at least in part on the priority level.

For example, notification service module 22 may determine a priority level associated with one or more notifications 18 received from applications 24. The priority level may indicate a measure of importance of one of notifications 18 (e.g., notification 18A) in comparison to other notifications 18 and/or relative to predicted user interest. For instance, a high priority notification may represent a notification from a text messaging application since notification service module 22 may determine that a user likely finds notifications similar to notification 18A to be important to the user. A lower priority notification may represent a notification from one or more game applications since notification service module 22 may determine that a user likely does not normally consider these notifications (e.g., notifications 18D and 18E) to be of high importance. Notification service module 22 may be preprogrammed to determine a priority level of a notification. In other examples, notification service module 22 may be configurable and allow inputs from a user to assign priority levels based on the notification's source (e.g., application and/or remote service of origin).

Notification service module 22 may categorize notifications as either high priority or low priority notifications by comparing the priority level of a notification to a priority threshold. For example, in response to determining that the priority level associated with the notification does not satisfy a priority threshold (e.g., the priority level is low), notification service module 22 of computing device 10 may determine that the notification is a low priority notification and therefore the content corresponding to the notification includes only a first content portion of the content corresponding to the notification. Conversely, in response to determining that the priority level associated with the notification satisfies the priority threshold (e.g., the priority level is high), computing device 10 may determine that the notification represents a high priority notification and that the content corresponding to the notification includes both a first content portion and a second content portion of the content corresponding to the notification. In either case, the first content portion may include less information associated with the notification than the second content portion. Notification service module 22 may include less information in a graphical indication of a low priority notification than a graphical indication of a high priority notification.

Computing device 10 may output, for display, the graphical indication of the notification including the determined content (based at least in part on the priority level) corresponding to the notification. For example, notification service module 22 may determine a priority level of a notification received from applications 24. Based on the priority level, notification service module 22 may send information to UI module 20 for presenting a graphical indication of the notification. A high priority notification may cause notification service module 22 to send information that includes a first content portion and a second content portion within the graphical indication of the notification (e.g., as shown by the graphical indication of notification 18A of FIG. 1) to UI module 20. A lesser priority notification may cause notification service module 22 to send information that includes only a first content portion within the graphical indication of the notification (e.g., as shown by the graphical indication of notifications 18D-18F) to UI module 20. In this way, notification service module 22 may cause computing device 10 to automatically output, for display, expanded graphical indications of higher priority notifications 18 that include more content within a graphical indication. Notification service module may cause computing device 10 to automatically output, for display, unexpanded graphical indications of lesser priority notifications 18 that include less content within a graphical indication. In some examples, computing device 10 can only display a limited number of graphical indications of notifications 18 at one time. By presenting either expanded or unexpanded graphical indications of notifications based on priority levels, computing device 10 can ensure the content of higher priority notification 18 is not displaced by the content of lesser priority notifications 18.

Some of these techniques may provide for better management of content associated with notifications 18 and may help ensure a user can obtain sufficient information from notifications 18 when computing device 10 presents notification center 16. In addition, by varying the presentation of higher priority notifications from lower priority notifications, computing device 10 may present a more useful way for a user to interact with notifications 18 and manage notifications 18. Furthermore, presenting selectable options for notifications 18 and providing for configuration of notifications 18 from these options may enable a user to tailor notifications 18 for a specific function of computing device 10. Better management and configuration of notifications 18 may result in fewer inputs from a user to perform functions with computing device 10. As a result, computing device 10 may perform fewer operations associated with a function and in turn, consume less electrical power.

Figure 2:
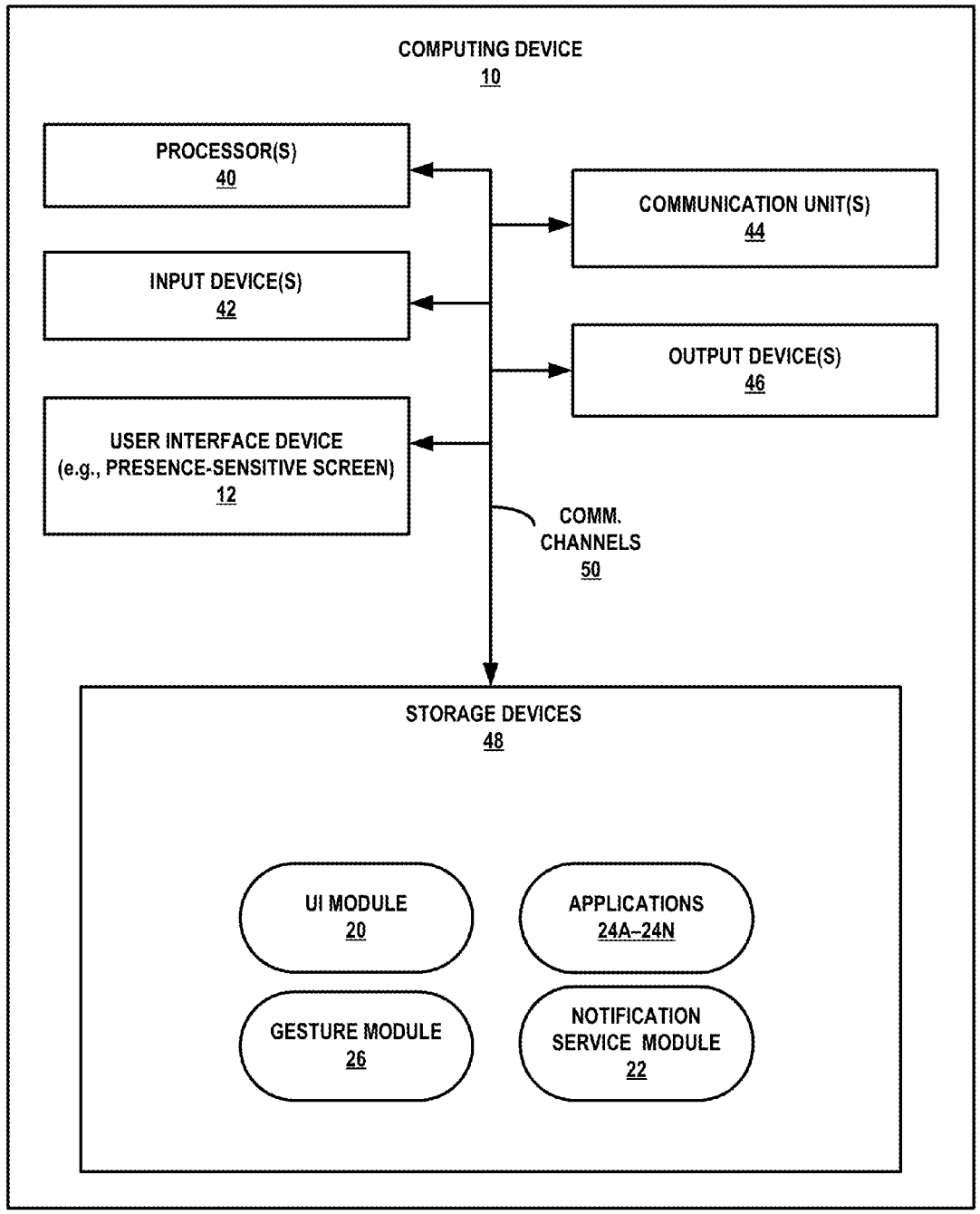
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, notification service module 22, applications 24, and gesture module 26. Communication channels 50 may interconnect each of the components 12, 13, 20, 22, 24, 26, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 12 of computing device 10 may include functionality of input devices 42 and/or output devices 46. In the example of FIG. 2, UID 12 may be or may include a presence-sensitive screen. In some examples, a presence sensitive screen may detect an object at and/or near the presence-sensitive screen. As one example range, a presence-sensitive screen may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen and other ranges are also possible. The presence-sensitive screen may determine the location of the screen selected by a user's finger using capacitive, inductive, and/or optical recognition techniques. In some examples, presence sensitive screen provides output to a user using tactile, audio, or video stimuli as described with respect to output device 46. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by one or more applications 24 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, notification service module 22, applications 24, and gesture module 26.

One or more processors 40 may implement functionality and/or execute instructions within computing device 10. For example, processors 40 on computing device 10 may receive and execute instructions stored by storage devices 48 that execute the functionality of UI module 20, notification service module 22, applications 24, and gesture module 26. These instructions executed by processors 40 may cause computing device 10 to store information, within storage devices 48 during program execution. Processors 40 may execute instructions of modules 20, 22, and 26, as well as instructions of applications 24 to cause UID 12 to present user interface 14 with notification center 16, and notifications 18 at UID 12. That is, modules 20, 22, and 26, as well as applications 24, may be operable by processors 40 to perform various actions or functions of computing device 10, for instance, causing UID 12 to present user interface 14 at UID 12.

In accordance with aspects of this disclosure computing device 10 of FIG. 2 may output for display, a graphical indication of a notification. In various instances, the notification may be associated with at least one application executing at computing device 10. In other instances, the notification may be associated with at least one application and/or service executing at one or more computing devices remote from computing device 10. The graphical indication of the notification may include one or more selectable graphical elements indicating one or more respective optional actions associated with the notification. For example, an e-mail application may receive information about new e-mail messages received over communication channels 50. The e-mail application may send information associated with the e-mail as notification 18B over communication channels 50 to notification service module 22. The content of notification 18B may include a first content portion, such as an indication of the name of the e-mail account associated with the new e-mail message. The content of notification 18B may also include a second content portion, such as the name of the sender, the subject, and the first few words of the e-mail message.

Notification service module 22 may receive notification 18B from the e-mail application and generate a graphical indication of notification 18B and include within the graphical indication one or more selectable graphical elements 19 that indicate respective optional actions associated with the notification. That is, the graphical indication of notification 18B may include one or more graphical buttons, such as selectable graphical element 19. Notification service module 22 may cause computing device 10 to present the entire body of the e-mail message corresponding to notification 18B in response to a selection of selectable graphical element 19.

Notification service module 22 may include the graphical indication of notification 18B within notification center 16. Notification module 22 may send, over communication channels 50, information of the graphical layout of notification center 16 to UI module 20 along with instructions for presenting the graphical indication of notification 18B within notification center 16. UI module 20 may receive the graphical layout and the instructions from notification service module 22 and in turn, send over communication channels 50, instructions to UID 12 that cause UID 12 to output notification center 16 and the graphical indication of notification 18B for display.

Computing device 10 may receive an indication of an input detected at a presence-sensitive input device to select the selectable graphical element. For example, a user may perform a gesture with one or more fingers, stylus, pen, or other input device at a location of UID 12 corresponding to where UID 12 presents selectable graphical element 19. Gesture module 26 may receive information about the input from UID 12 and determine one or more touch events based on the input. For example, gesture module 26 of computing device 10 may receive from UID 12, one or more indications of input detected by UID 12. Generally, each time UID 12 receives an indication of input, gesture module 26 may receive information about the input from UID 12. Gesture module 26 may assemble the information received from UID 12 into a time-ordered sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of UID 12, a time component associated with when UID 12 detected input at the location, and an action component associated with whether the touch event corresponds to a lift up or a push down at the location.

Gesture module 26 may determine one or more characteristics of the input based on the sequence of touch events and include information about these one or more characteristics within each touch event in the sequence of touch events. For example, gesture module 26 may determine a start location of the input, an end location of the input, a density of a portion of the input, a speed of a portion of the input, a direction of a portion of the input, and a curvature of a portion of the input. One or more touch events in the sequence of touch events may include (in addition to a time, a location, and an action component as described above) a characteristic component that includes information about one or more characteristics of the input (e.g., a density, a speed, etc.). Gesture module 24 may transmit over communication channels 50, as output to UI module 20, the sequence of touch events including the components or parameterized data associated with each touch event.

UI module 20 may receive the one or more touch events from gesture module 26 and determine the input occurred at a portion of UID 12 corresponding to a location where UID 12 presents notification center 16 and the graphical indication of notification 18B. UI module 20 may determine that the input represents a user interaction with notification center 16. In response to the determination about the input, UI module 20 may send the one or more touch events to notification service module 22. Notification service module 22 may receive the one or more touch events from UI module 20 and determine, based on the time and location components of the one or more touch events, that the input represents an indication from a user to select selectable graphical element 19.

Responsive to receiving the input, computing device 10 may execute the optional action. In other words, notification service module 22 may cause computing device 10 to execute the e-mail application that generated notification 18B which may cause computing device 10 to present the body of the e-mail at UID 12. For example, notification service module 22 may cause computing device 10 to execute a process of the e-mail application for viewing the e-mail associated with notification 18B. The process of the e-mail application may execute at one or more processors 40 and the execution may cause UI module 20 and UID 12 to present the e-mail corresponding to notification 18B.

Computing device 10 may output, for display, a respective graphical indication of each one of notifications 18. The respective graphical indication of a first notification of the plurality of notifications 18 may include both a first content portion and a second content portion corresponding to the first notification and the respective graphical indication of a second notification of the plurality of notifications 18 may include unexpanded content corresponding to the second notification.

In other words, and in some instances to preserve viewable area of UID 12, notification service module 22 may cause computing device 10 to present the graphical indication of a notification as an unexpanded graphical indication by including only a first content portion (e.g., a quantity of unread e-mail messages received by an e-mail application) rather than present the graphical indication as an expanded graphical indication with both a first content portion and a second content portion (e.g., a quantity of unread e-mail messages and the body, sender, subject, etc. of the unread e-mail messages).

For example, notification service module 22 may receive notifications 18B and 18F from the e-mail application and send information to UI module 20 that causes UI module 20 to instruct UID 12 to present graphical indications of both notifications 18B and 18F. The graphical indication of notification 18B (e.g., the first notification) may include both a first content portion of an e-mail notification received by the e-mail application (e.g., the name and e-mail address of the sender of an e-mail, an envelope e-mail icon, etc.) and a second content portion of the e-mail notification (e.g., the subject of the e-mail, the first few words of the message, selectable graphical element 19, etc.). The graphical indication of notification 18F (e.g., the second notification) may include only a first content portion of an e-mail notification received by the e-mail application (e.g., an indication of a quantity of unread e-mail messages received by the e-mail application, an e-mail address associated with the e-mail account that received the e-mail messages). Notification service module 22 may command UI module 20 to cause UID 12 to present the graphical indications of notifications 18A and 18B.

Computing device 10 may receive an indication of an input detected at a presence-sensitive input device to remove the first notification from display. For instance, the user may wish to remove the expanded graphical indication of notification 18B from notification center 16. The user may provide a tap, non-tap, swipe, pinch, and/or other gesture at a location of UID 12 corresponding to where UID 12 presents the graphical indication of notification 18B. Gesture module 26 may receive information about the gesture input from UID 12 and send one or more touch events to UI module 20 about the gesture input. UI module 20 may compare the location components of the one or more touch events to locations of where UID 12 presents the graphical indications of notifications 18B and 18F and determine the gesture input represents a user interacting with notification center 16. UI module 20 may transmit over communication channels 50 the one or more touch events to notification service module 22.

Responsive to receiving the indication of the input, computing device 10 may refrain from outputting, for display, the respective graphical indication of the first notification and may output the respective graphical indication of the second notification to include a second content portion corresponding to the second notification in addition to the first content portion corresponding to the second notification. For example, notification service module 22 may receive the one or more touch events from UI module 20 and determine, based on the location and time components of the one or more touch events that the one or more touch events represent a gesture input to remove notification 18B from display. Notification service module 22 may modify the graphical layout of notification center 16 to remove notification 18B and stop handling (e.g., clear from memory associated with notification service module 22) notification 18B.

In addition to removing the graphical indication of notification 18B from the graphical layout of notification center 16, notification service module 22 may modify the graphical indication of notification 18F to include a second content portion corresponding to notification 18F in addition to the first content portion corresponding to notification 18F. In other words, initially, notification service module 22 may show some graphical indications of notifications 18 with expanded content and show other notifications 18 with unexpanded content. When one of the expanded graphical indications corresponding to one of notifications 18 is cleared (e.g., removed from display), notification service module 22 may automatically expand the graphical indication of one of the other unexpanded graphical indications that was beneath the cleared graphical indication. In some examples, the unexpanded graphical indication that immediately followed the cleared graphical indication is the graphical indication that notification service module 22 automatically expands.

Notification service module 22 may output the graphical layout of notification center 16 to include a second content portion corresponding to notification 18F within the graphical indication of notification 18F. Notification service module 22 may output the modified layout of notification center 16, to UI module 20. In response to the modified layout, UI module 20 may cause UID 12 to present the modified notification center 16 at the presence-sensitive screen which no longer includes the graphical indication of notification 18B and instead includes an expanded graphical indication of notification 18F having both first and second content portions.

Computing device 10 may automatically present expanded and more informative graphical indications of important (e.g., higher priority) notifications 18 and present unexpanded and less informative graphical indications of less important (e.g., lesser priority) notifications 18. Computing device 10 may receive a notification and determine a priority level associated with the notification. Computing device 10 may determine appropriate content corresponding to the notification to include in a graphical indication of the notification based at least in part on the priority level.

For example, notification service module 22 may determine a priority level associated with one or more notifications 18. The priority level may indicate a measure of importance of the notification in comparison to other notifications 18. A high priority notification may represent a notification from a text messaging application since notification service module 22 may determine that a user likely finds notifications from a text messaging application to be important to the user. A lower priority notification may represent a notification from a game application since notification service module 22 may determine that a user likely does not normally consider notifications from game applications to be of high importance. Notification service module 22 may be preprogrammed to determine a priority level of a notification based on the source and/or context of the notification. In other examples, notification service module 22 may be configurable and allow inputs from a user to assign priority levels to notifications from particular sources.

Computing device 10 may output, for display, the graphical indication of the notification including the content (based at least in part on the priority level) corresponding to the notification. For example, based on the priority level, notification service module 22 may send information to UI module 20 for presenting a graphical indication of the notification. A high priority notification may cause notification service module 22 to send information that includes both first and second content portions within an expanded graphical indication of the notification. A lesser priority notification may cause notification service module 22 to send information that includes only a first content portion within an unexpanded graphical indication of the notification. In this way, notification service module 22 may cause computing device 10 to automatically output for display more content for higher priority notifications 18 than the content that computing device 10 presents for lesser priority notifications 18. A user that views graphical indications of notifications 18 in this way may be more quickly alerted to information about higher priority notifications.

Figure 3:
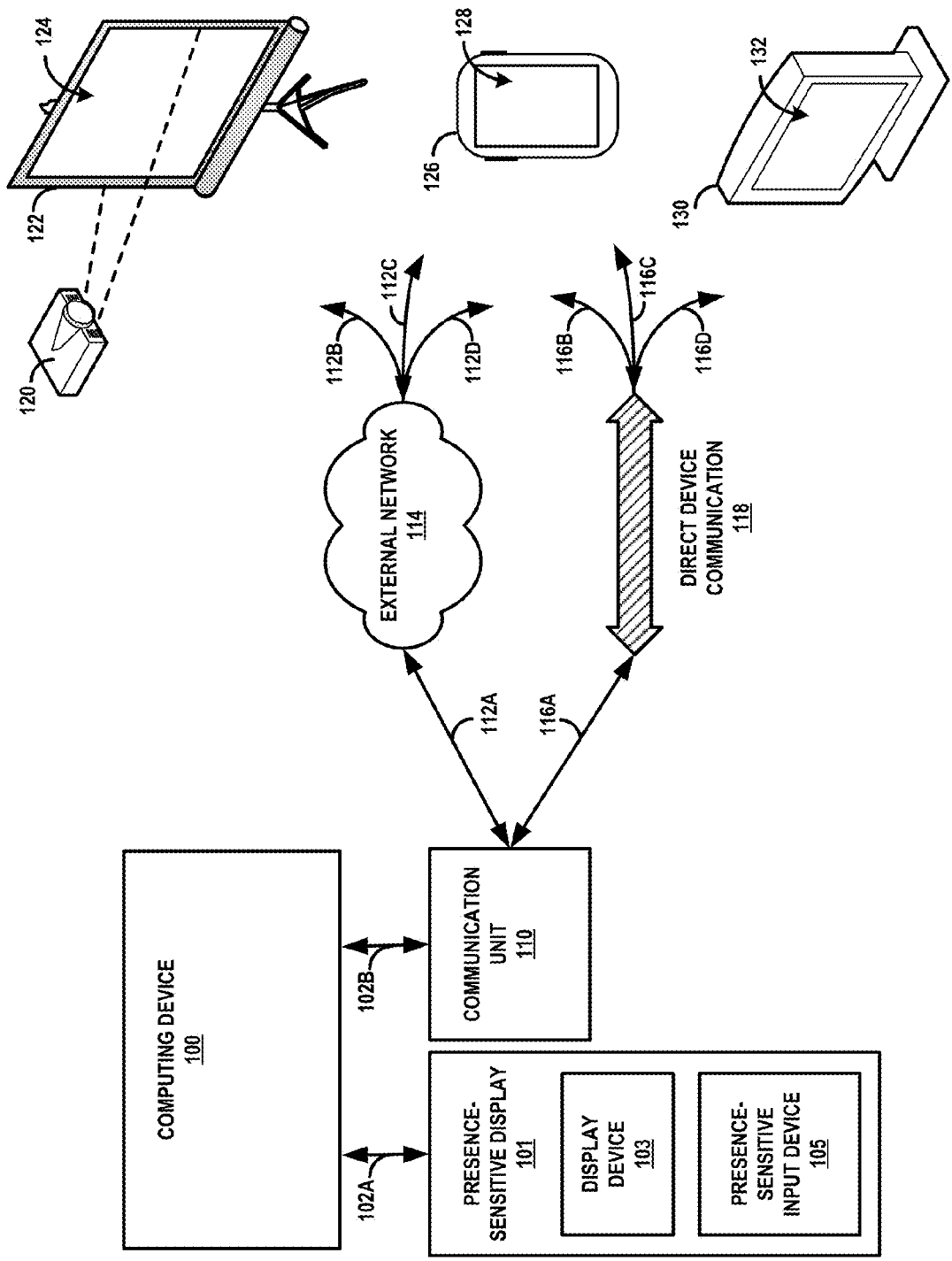
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi__ 33, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a notification center graphical user interface for display at presence-sensitive display 132. For instance, computing device 100 may send data that includes a representation of notification center 16, including an expanded graphical indication of notification 18B which includes both a first content portion and a second content portion corresponding to notification 18B, to communication unit 110. The first content portion may include an e-mail icon and the second content portion may include a sender of an e-mail associated with notification 18B, the subject and portions of the body of the e-mail. In addition, the second content portion may include one or more selectable graphical elements, such as selectable graphical element 19. Communication unit 110 may send the data that includes the representation of notification center 16 to visual display device 130 using external network 114. Visual display device 130, in response to receiving the data using external network 114, may cause presence-sensitive display 132 to output notification center 16. In response to a user performing a gesture at presence-sensitive display 132 to select graphical element 19 within the graphical indication of notifications 18B, visual display device 130 may send an indication of the gesture to computing device 100 using external network 114. Communication unit 110 of may receive the indication of the gesture, and send the indication to computing device 100.

Computing device 100 may determine the gesture represents a selection of graphical element 19. For example, in some instances, computing device 100 utilizes gesture module 26, UI module 20, and notification service module 22 to determine that selectable graphical element 19 of the graphical indication of notification 18B is selected. Computing device 100 may execute a selectable option associated with graphical element 19 based on the gesture. For example, computing device 100 may execute a process of the e-mail application that generated notification 18B to cause the e-mail application to present the body of the related e-mail within notification center 16. Computing device 100 may send data that includes a modified notification center 16 including the body of the e-mail within the graphical indication of notification 18B to communication unit 110. Communication unit 110, in turn may send the data to visual display device 130 using external network 114. Upon receiving the data, visual display device 130 may cause presence-sensitive display 132 to display the modified notification center 16. In this way, processor 102 may output the graphical indications of notifications 18 for display at presence-sensitive screen 132, in accordance with techniques of the disclosure.

Figure 4:
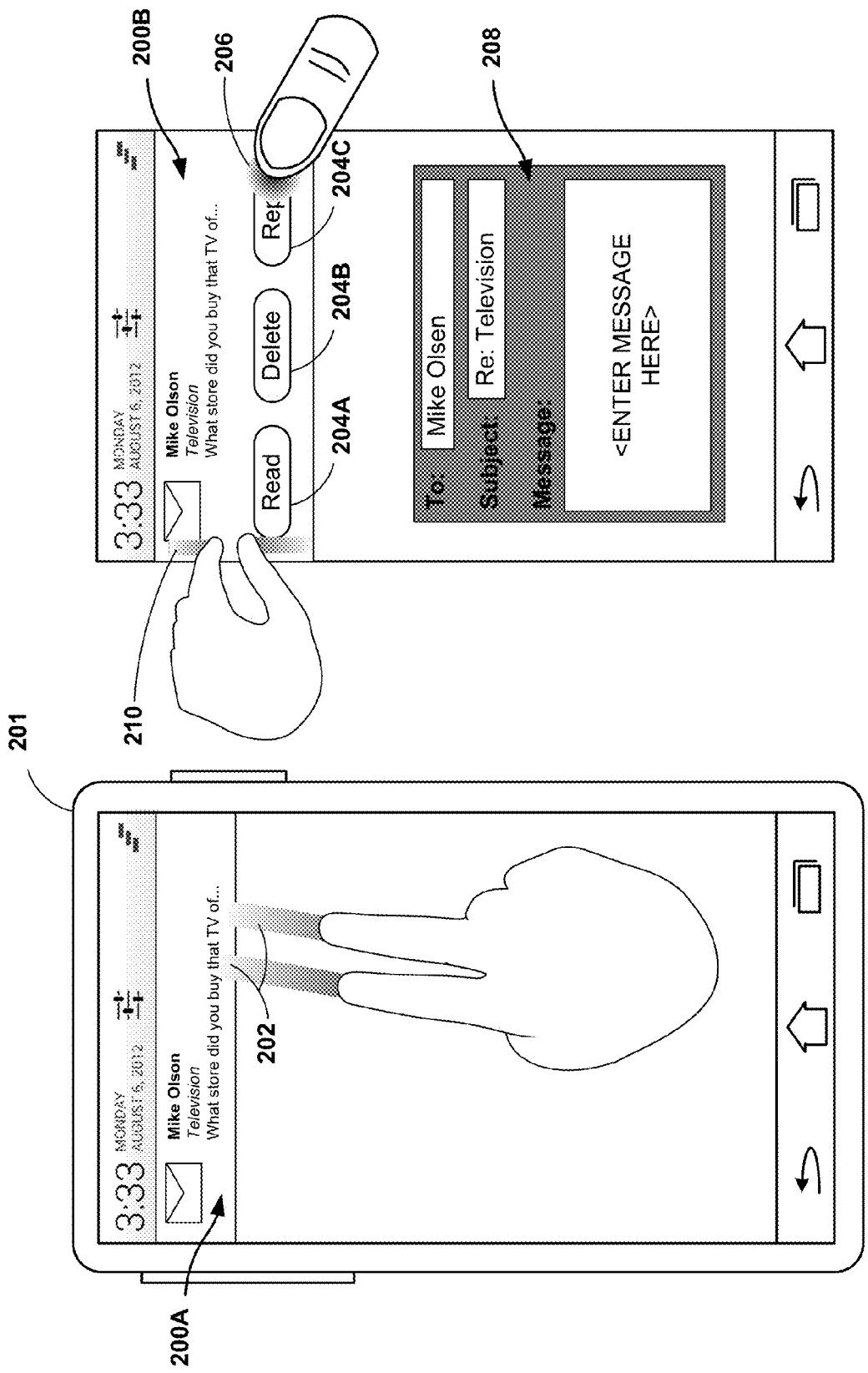
FIGS. 4A and 4B are conceptual diagrams illustrating example graphical indications of notifications, in accordance with one or more aspects of the present disclosure.

FIGS. 4A and 4B are conceptual diagrams illustrating example notification center graphical user interfaces, in accordance with one or more aspects of the present disclosure. In the example of FIG. 4A, computing device 201 is a mobile phone. Computing device 201 is one example of computing device 10 shown in FIGS. 1 and 2 and may include similar hardware and software components as included in computing device 10, such as UID 12, UI module 20, notification service module 22, and one or more applications 24.

In accordance with techniques of this disclosure, computing device 201 may output, for display, unexpanded graphical indication 200A including a first content portion corresponding to a notification received from an application executing at computing device 201. For example, computing device may present graphical indication 200A at UID 12. The first content portion included within the presentation of graphical indication 200A includes the sender, the subject, and the first few words of an e-mail message notification.

Computing device 201 may receive an indication of a first input detected at a presence-sensitive input device, the first input corresponding to a command to expand the graphical indication 200A. For example, a user may provide multi-finger gesture 202 at a portion of UID 12 corresponding to the location where the UID 12 presents graphical indication 200A. Computing device 201 may determine gesture 202 corresponds to a command to expand graphical indication 200A.

Responsive to receiving the first input, computing device 201 may modify, graphical indication 200A of the notification to include a second content portion corresponding to the notification in addition to the first content portion. The second content portion may include selectable graphical elements 204A, 204B, 204C that indicate respective optional actions associated with the notification. In other words, notification service module 22 may receive information about gesture 202 from UI module 20 and determine gesture 202 represents a command from a user to expand graphical indication 200A of the e-mail notification. Notification service module 22 may cause UI module 20 to update the presentation of graphical indication 200A to be the presentation of graphical indication 200B as shown in FIG. 4B. Graphical indication 200B includes selectable graphical elements 204A, 204B, 204C that are each associated with respective optional actions for viewing, deleting, and replying to the e-mail corresponding to the e-mail notification.

Computing device 201 may receive an indication of a second input detected at the presence-sensitive input device to select one or more of selectable graphical elements 204A, 204B, and/or 204C. For example, FIG. 4B illustrates a user providing tap-gesture 206 at a portion of UID 12 corresponding to a location at which graphical element 204C is displayed. Notification service module 22 may receive information about gesture 206 from UI module 20 and determine gesture 206 represents a selection of graphical element 204C.

Responsive to receiving the second input, computing device 201 may execute the optional action associated with the selected graphical element 204C. For example, notification service module 22 may cause computing device 201 to invoke and execute a process of the e-mail application for replying to the e-mail message associated with the notification corresponding to graphical indication 200A.

In some examples, computing device 201 may output graphical indication 200B within a notification center graphical user interface. For example, graphical indications 200A, 200B may be presented by computing device 201 within a notification center graphical user interface such as notification center 16 of FIG. 1. Notification service module 22 may control the presentation of graphical indications (e.g., graphical indication 200A, 200B) within the notification center graphical user interface.

In some examples, where computing device 201 includes graphical indications of notifications within a notification center graphical user interface, computing device 201 may execute the optional action within the notification center graphical user interface. For example, computing device 201 may present a user interface for replying to the e-mail message within graphical indication 200B and computing device 201 may allow a user to compose a reply to the e-mail message within graphical indication 200B and without navigating to a different user interface.

In some examples, computing device 201 may executing the optional action by outputting for display an overlay to receive information to complete execution of the optional action. For example, FIG. 4B illustrates overlay 208 that includes a user interface for replying to the e-mail message associated with the notification. This overlay may be a window that appears beneath graphical indication 200B and/or partially or completely covers graphical indication 200B. After selecting graphical element 204B, notification service module 22 may cause computing device 201 to present overlay 208.

In some examples, notification service module 22 may determine a type of the notification and based at least in part on the type of the notification, notification service module 22 may determine the optional action and associated selectable graphical elements associated with the notification. For example, notification service module 22 may categorize each notification into types such as notifications related to a text message, an e-mail message, a calendar event, a phone call, a game status, a social media update, etc. Notification service module 22 determine an appropriate action to take in response to the selection of graphical element 204C based at least in part on the type. In this example, notification service module 22 may determine the type of notification is an e-mail notification in response to determining that the corresponding notification was received from an e-mail application. Notification service module 22 may determine gesture 206 represents a selection of graphical element 204C for replying to an e-mail message associated with the e-mail notification received from the e-mail application. In a different example, notification service module 22 may determine the type of notification is a text message notification and in response to the selection of graphical element 204C determine the optional action corresponds to replying to the text message.

In some examples, responsive to executing the optional action, computing device 201 may output, for display, an unselectable graphical element indicating execution of the optional action, the unselectable graphical element replacing the selectable graphical element. For example, after composing the reply to the e-mail message, notification service module 22 may cause computing device 201 to update the presentation of graphical indication 200B by including text of the words, "e-mail sent" within graphical indication 200B. The text may represent a "tomb stone" indicating computing device 201 has completed execution of the optional action. Computing device 201 may present the text within graphical indication 200B to replace graphical element 204C.

In some examples, computing device 201 may receive an indication of an input detected at the presence-sensitive input device to collapse the graphical indication and may modify the graphical indication of the notification to replace the selectable graphical element with textual information corresponding to the notification. The second input may be a pinch gesture. For example, FIG. 4B illustrates a user performing gesture 210 to collapse expanded graphical indication 200B of the e-mail notification. Notification service module 22 may receive information from UI module 20 related to gesture 210 and determine that gesture 210 represents a gesture to minimize and/or collapse graphical indication 200B. For instance, the user may wish to cause graphical indication 200B to be presented as graphical indication 200A of FIG. 4A. Notification service module 22 may send information to UI module 20 for modifying the presentation of graphical indication 200B to remove the second content portion (e.g., graphical elements 204A, 204B, and 204C). UI module 20 may receive the information from notification service module 22 and update the presentation of graphical indication 200B at UID 12 of computing device 201 to include only the first content portion which includes textual information corresponding to the e-mail notification.

Figure 5:
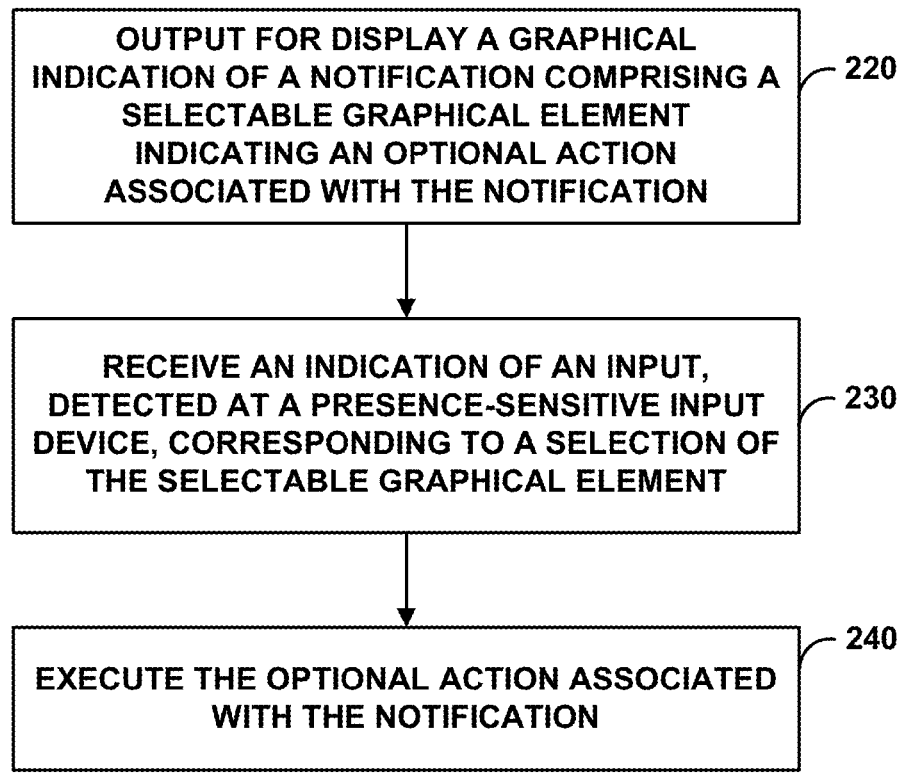
FIG. 5 is a flowchart illustrating an example operation of a computing device, in accordance with one or more aspects of the present disclosure.

FIG. 5 is a flowchart illustrating an example operation of the computing device, in accordance with one or more aspects of the present disclosure. The process of FIG. 5 may be performed by one or more processors of a computing device, such as computing device 10 illustrated in FIG. 1 and FIG. 2. For purposes of illustration only, FIG. 5 is described below within the context of computing devices 201 of FIGS. 4A and 4B.

In the example of FIG. 5, a computing device may output for display a graphical indication of a notification comprising a selectable graphical element indicating an optional action associated with the notification (220). For example, computing device 201 may output graphical indication 200B for display at UID 12. Graphical indication 200B represents a graphical indication of a notification generated by an e-mail application. Graphical indication 200B includes selectable graphical elements 204A, 204B, and 204C.

The computing device may receive an indication of an input, detected at a presence-sensitive input device, corresponding to a selection of the selectable graphical element (230). For instance, computing device 201 may receive information about an indication of gesture 206 detected at a location of UID 12 that corresponds to a location where UID 12 presents selectable graphical element 204C. Notification service module 22 may receive information about gesture 206 from UI module 20 and determine gesture 206 represents a selection of graphical element 204C.

Responsive to receiving the indication of the input, the computing device in the example of FIG. 5 may execute the optional action associated with the notification (240). For example, in response to determining a selection of graphical element 204C, computing device 201 may execute the optional action associated with graphical element 204C by causing UI module 20 to present overlay 208 at UID 12, from which the user can reply to the e-mail.

FIGS. 6A and 6B are conceptual diagrams illustrating further example graphical indications of notifications, in accordance with one or more aspects of the present disclosure. Computing device 301 is one example of computing device 10 shown in FIGS. 1 and 2 and may include similar hardware and software components as included in computing device 10, such as UID 12, UI module 20, notification service module 22, and applications 24.

In accordance with techniques of this disclosure, computing device 301 may output, for display a respective graphical indication of each notification of a plurality of notifications. The respective graphical indication of a first notification of the plurality of notifications may include both a first content portion and a second content portion corresponding to the first notification. The respective graphical indication of a second notification of the plurality of notifications may include only a first content portion corresponding to the second notification.

For instance, notification service module 22 may receive notifications from various applications 24 executing at computing device 301. Notification service module 22 may cause UI module 20 to present a notification center graphical user interface at UID 12 of computing device 301 (e.g., a presence-sensitive screen) that includes graphical indication 300A of a text message notification received from a text message application. Graphical indication 300A includes a first content portion corresponding to the text message notification (e.g., text of the last three correspondences in a text message chain) and a second content portion corresponding to the text message application (e.g., a selectable graphical element for replying to the text message notification). Notification service module 22 may cause UI module 20 to present at UID 12 of computing device 301 graphical indication 302A of a social media notification received from a social media application.

Graphical indication 302A includes only a first content portion (e.g., an icon related to the social media application and text indicating an update posted within a social media network) corresponding to the social media notification. Notification service module 22 may cause UI module 20 to present at UID 12 graphical indications 303A and 304A of an e-mail notification received from an e-mail application and a game play notification received from a game application, respectively.

In some examples, graphical indications 300A, 302A, 303A, and 304A are included within a notification center graphical user interface. In some examples, the respective graphical indication 300A of the first notification that includes both the first and the second content portions is displayed within a top portion of the notification center graphical user interface, and the respective graphical indication of each of the notifications of the plurality of notifications other than the first notification (e.g., graphical indications 302A, 303A, and 304A) that includes only a first content portion is displayed beneath the respective graphical indication 300A of the first notification. In other words, to maximize a quantity of graphical indications that computing device 301 can present at one time, notification service module 22 may cause UI module 20 to present a notification center graphical user interface at UID 12 of computing device 301 with the first (e.g., top) graphical indication of a notification in an expanded state and the other graphical indications of notifications in an unexpanded state and beneath the first graphical indication.

Computing device 301 may receive an indication of an input detected at a presence-sensitive input device to remove the first notification from display. For example, to clear the text message notification, a user of computing device 301 may provide swipe gesture 305 at a portion of UID 12 of computing device 301 that corresponds to a location of UID 12 that presents graphical indication 300A. Notification service module 22 may receive information about gesture 305 from UI module 20.

In some examples, computing device 301 may output, for display, a graphical element corresponding to an option (e.g., a command) to remove (e.g., clear) the first notification from display. For example, graphical element 305 represents a graphical button for clearing the notification associated with graphical indication 300A. Computing device 301 may determine, based at least in part on the input, a selection of the graphical element. For instance, notification service module 22 may determine gesture 305 represents a selection of graphical element 305 and determine gesture 305 represents a command from a user to clear the notification associated with graphical indication 300A.

As shown in FIG. 6B, responsive to the selection, computing device 301 may cease outputting for display, the respective graphical indication of the first notification, and modify the respective graphical indication of the second notification to include a second content portion corresponding to the second notification in addition to the first content portion corresponding to the second notification. In other words, notification service module 22 may determine gesture 305 represents a command from a user to clear the notification associated with graphical indication 300A. Notification service module 22 may cause UI module 20 to stop outputting (e.g., refrain from outputting) graphical indication 300A at UID 12.

To maximize the amount of notification content presented to the user after clearing the text message notification, notification service module 22 may further, automatically cause UI module 20 to expand graphical indication 302A and present graphical indication 302B which includes both the first content portion corresponding to the social media notification (e.g., an icon related to the social media application and text indicating an update posted within a social media network) and a second content portion corresponding to the social media notification (e.g., a graphical image posted to the social media network). In some examples, the second content portion of the second notification (e.g., the social media notification) includes one or more selectable graphical elements each corresponding to an option (e.g., a command) to perform one or more functions associated with the second notification. For instance, graphical indication 302B in FIG. 6B shows selectable graphical elements 306A, 306B, 306C that correspond to functions related to approving, commenting, and disapproving, respectively, of the social media update associated with the social media notification.

In some examples, computing device 301 automatically outputs, for display, the modified graphical indication of the second notification within a top portion of the notification center graphical user interface such that the graphical indication of the second notification replaces the respective graphical indication of the first notification. In other words, computing device 301 may automatically present a top-most graphical indication in an expanded state and each of the other graphical indications within the notification center graphical user interface (e.g., graphical indications 303B and 304B) in an unexpanded state.

In some examples, as shown in FIG. 6B, the modified graphical indication of the second notification includes more information corresponding to the second notification than the unmodified graphical indication of the second notification. In other words, by including a second content portion within graphical indication 300B in addition to the first content portion, graphical indication 300B, the modified graphical indication, includes more information about the social media notification than graphical indication 300A, the original graphical indication.

In this way, display area of the display device where computing device 301 presents graphical indications of notifications may be maximized to present a maximized quantity of multiple graphical indications. The top-most graphical indication may be more useful to a user since the top-most graphical indication automatically includes more information related to the corresponding notification than the other graphical indications.

Figure 7:
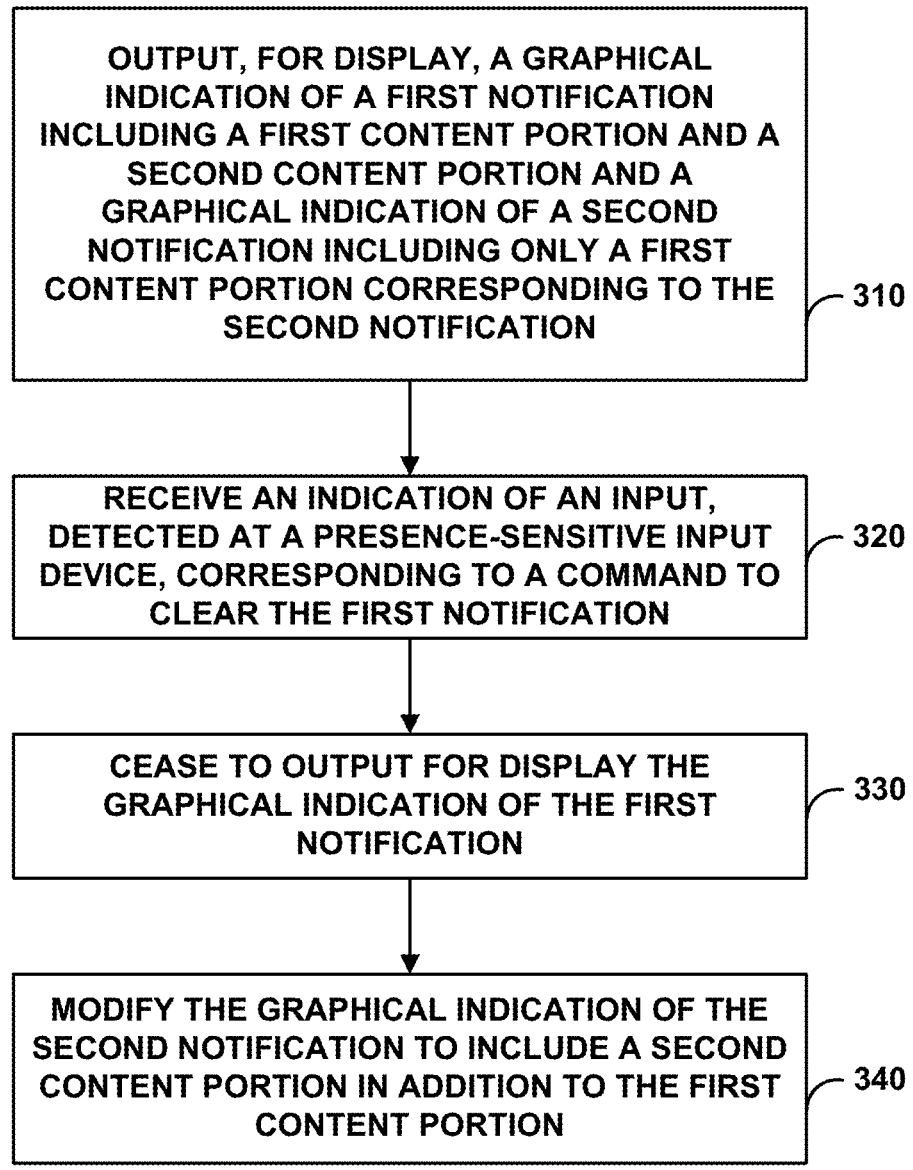
FIG. 7 is a flowchart illustrating further example operations of a computing device, in accordance with one or more aspects of the present disclosure.

FIG. 7 is a flowchart illustrating further example operations of the computing device, in accordance with one or more aspects of the present disclosure. The process of FIG. 7 may be performed by one or more processors of a computing device, such as computing device 10 illustrated in FIG. 1 and FIG. 2. For purposes of illustration only, FIG. 7 is described below within the context of computing device 301 of FIG. 6.

In the example of FIG. 7, a computing device may output, for display, a graphical indication of a first notification including both a first content portion and a second content portion of the first notification and a graphical indication of a second notification including only a first content portion of the second notification (310). For example, notification service module executing at computing device 301 may cause UI module 20 to output graphical indications 300A and 302A for display at UID 12. Graphical indication 300A is presented in an expanded state and includes both a first content portion and a second content portion corresponding to a text message notification. Graphical indication 302A is presented in an unexpanded state and includes only a first content portion corresponding to a social media post notification. Computing device 301 may present expanded graphical indication 300A in a top portion of a notification center graphical user interface, above unexpanded graphical indication 302A.

The computing device may receive an indication of an input, detected at a presence-sensitive input device, corresponding to a command to remove the first notification from display (320). For example, a user of computing device 301 may provide gesture 305 at a portion of UID 12 corresponding to a location at which UID 12 presents graphical indication 300A. Gesture 305 may be a swipe gesture and/or a gesture to select graphical element 305 to clear graphical indication 300A.

In the example of FIG. 7, the computing device may cease to output, for display, the graphical indication of the first notification (330). For instance, notification service module 22 may receive information about gesture 305 from UI module 20 and determine from locations within the information to clear the text notification associated with graphical indication 300A. Notification service module 22 may cause UI module 20 to update the presentation of the notification center graphical user interface by removing and refraining from outputting graphical indication 300A at UID 12.

The computing device may output the graphical indication of the second notification such that the graphical indication of the second notification includes a second content portion of the second notification in addition to the first content portion of the second notification (340). For example, in addition to clearing graphical indication 300A from UID 12, notification service module 22 may cause UI module 20 to automatically present graphical indication 302B at UID 12 at the top portion of the notification center graphical user interface in place of graphical indication 302A. In other words, notification service module 22 may cause UI module 20 to expand graphical indication 302A and present graphical indication 302B having a second content portion corresponding to the social media post notification in addition to the first content portion.

Figure 8:
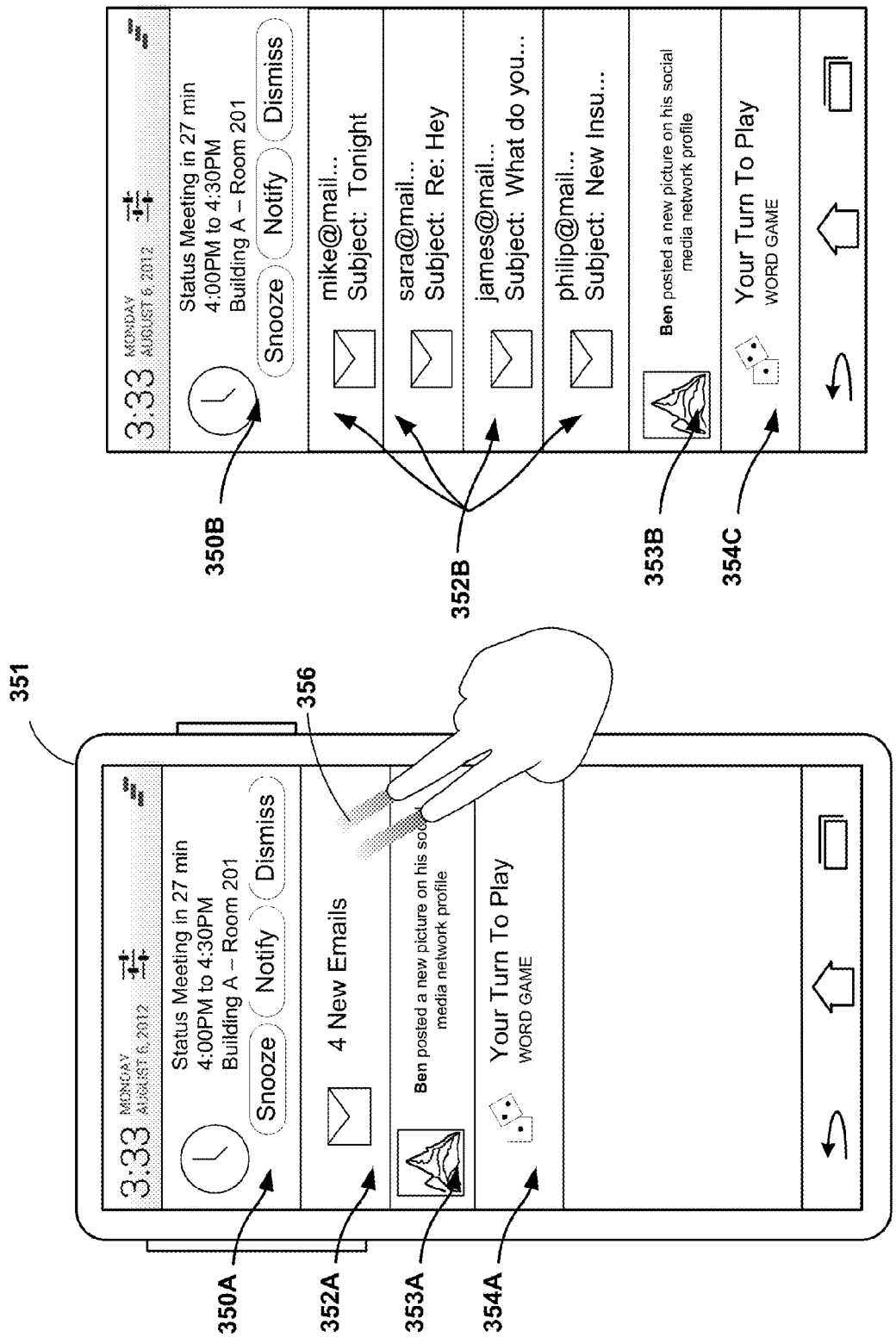
FIGS. 8A and 8B are conceptual diagrams illustrating further example graphical indications of notifications, in accordance with one or more aspects of the present disclosure.

FIGS. 8A and 8B are conceptual diagrams illustrating further example graphical indications of notifications, in accordance with one or more aspects of the present disclosure. Computing device 351 is one example of computing device 10 shown in FIGS. 1 and 2 and may include similar hardware and software components as included in computing device 10, such as UID 12, UI module 20, notification service module 22, and applications 24.

In accordance with techniques of this disclosure, a computing device may receive an indication of a notification. For example, one or more applications 24 may execute at computing device 351. Some of the applications 24 executing at computing device 351 may include a calendar application, an e-mail application, a social media application, and a game application. Each of these applications may transmit a respective indication of a notification and/or alert to notification service module 22.

Computing device 351 may determine a priority level associated with the notification. For example, notification service module 22 may determine a priority level associated with the notifications received from the calendar application, the e-mail application, the social media application, and the game application. The priority level may indicate to service module 22 a degree of importance of the notification relative to user interest. The priority level may be determined by notification service module 22 (e.g., based on a configurable attribute of computing device 351) and/or be provided as an inherent attribute of the notification and provided by the source of the notification (e.g., the application and/or service that generates the notification). In some examples, the priority level of a notification may correspond to a discrete numerical value ranging from one to ten. A more important notification may have a priority level between five and ten and a less important notification may have a priority level between one and five. Notification service module 22 may determine the priority level of the notifications received from the calendar application, the e-mail application, the social media application, and the game application have priority levels of ten, seven, three, and one respectively.

Computing device 351 may determine, based at least in part on the priority level, content corresponding to the notification. For example, notification service module 22 may determine that content of a high priority notification includes both a first portion of content and a second portion of content corresponding to the notification while the content of a low priority notification includes only a first portion of content corresponding to the notification. Notification service module 22 may compare the priority level of a notification to a priority threshold to determine whether the notification represents a high priority notification or a lesser priority notification. The priority threshold may represent a discrete priority level value (e.g., five). The priority threshold may otherwise depend on the priority levels of each of the notifications received by notification service module 22 (e.g., the priority threshold may reflect the highest value priority level of all the notifications received by notification service module 22). In the example of FIGS. 8A and 8B, the priority level tracks the highest priority level of all the notifications received (e.g., the priority threshold has a value of ten which corresponds to the calendar notification priority level).

Computing device 351 may determine the priority level associated with the notifications from the e-mail application, the social media application, and the game application do not satisfy a priority threshold and determine the content corresponding to each of these notifications comprises only a first portion of content corresponding to each of these notifications. Computing device 351 may determine the priority level associated with the notifications from the calendar application satisfies the priority threshold and determine the content corresponding to the calendar notification comprises both a first portion of content and a second portion of content corresponding to the notification.

Computing device 351 may output, for display, a graphical indication of the notification comprising the content corresponding to the notification. For example, FIG. 8A shows that notification service module 22 may cause UI module 20 to present expanded graphical indication 350A of the calendar notification at UID 12 of computing device 351. Expanded graphical indication 350A includes both a first portion of content (e.g., a clock icon and summary meeting information) and a second portion of content (e.g., multiple selectable graphical elements for performing a function related to the calendar notification). Notification service module 22 may cause UI module 20 to present unexpanded graphical indications 352A, 353A, and 354A associated with the notifications from, respectively, the e-mail application, the social media application, and the game application. Unexpanded graphical indications 352A, 353A, and 354A include only first portions of content corresponding to their respective notifications. In this way, computing device 351 automatically, and without user intervention, outputs for display expanded graphical indications of high priority notifications and unexpanded graphical indications of low priority notifications.

In some examples, computing device 351 may output the graphical indication of the notification within an area of a notification center graphical user interface. For instance, graphical indications 350A, 352A, 353A, and 354A may represent graphical indications of a notification center graphical user interface (e.g., shown in FIG. 1 as notification center 16). Computing device 351 may determine, based at least in part on the priority level, the area of the notification center graphical user interface at which the graphical indication is displayed. For example, the area of the notification center graphical user interface where higher priority notifications are displayed may be at the top portion of the notification center graphical user interface and the area of the notification center graphical user interface where lesser priority notifications are displayed may be below the top portion and/or in a lower portion of the notification center graphical user interface. In other words, the notification center graphical user interface may include a plurality of areas and computing device 351 may determine that the graphical indication is displayed within one of the plurality of areas based at least in part on the priority level of the notification. For instance, computing device 351 may output a high priority notification in one area and a low priority notification in a different area of the notification center graphical user interface.

In some examples, computing device 351 may receive an indication of second notification and determine, based at least in part on the second notification, the priority level of the first notification. For example, notification service module 22 may determine the priority level of notifications relative to the context and attributes of each notification. In other words, notification service module 22 may first receive the e-mail notification and determine the priority level of the e-mail notification is high (e.g., a value ten). Notification service module may subsequently receive the calendar notification and determine that the priority level of the calendar notification is higher than the e-mail notification. Notification service module 22 may decrease the priority level of the e-mail notification to a value of seven and assign a priority level ten to the calendar notification so that the calendar notification has a higher priority level than the e-mail application.

In some examples, computing device 351 may determine a priority level of the second notification and determine, based on the respective priority levels of the first and second notifications, a ranking of the first and second notifications. For example, notification service module 22 may determine a ranking of the notifications from the calendar application and the e-mail application based on the priority levels of each of the respective notifications. Notification service module 22 may determine the ranking with the highest priority notification ranking first and the lowest priority notification ranking last. For example, the ranking of these two notifications may range from first to second with the calendar notification ranking first and the e-mail notification ranking second.

Computing device 351 may output, for display, the graphical indication of the first notification and a graphical indication of the second notification within a notification center graphical user interface, wherein the graphical indications of the first and second notifications are displayed within respective areas of the notification center graphical user interface based at least in part on the ranking. In other words, FIG. 8A shows notification service module 22 ordering graphical indications 350A, 352A in ranked order with the graphical indication of the first ranked notification (e.g., graphical indication 350A) presented in an area of UID 12 above the area of UID 12 that includes the graphical indication of the next ranked notification (e.g., graphical indication 3502).

In some examples, where the content of a graphical indication comprises only a first portion of content, computing device 351 may receive an indication of an input detected at a presence-sensitive input device and modify, based at least in part on the input, the graphical indication of the notification to include a second content portion corresponding to the notification in addition to the first portion of content corresponding to the notification. For example, notification service module 22 may determine that the priority level of the e-mail application does not satisfy the priority threshold and causes UI module 20 to present graphical indication 352A at UID 12. Graphical indication 352A includes only a first portion of content of the corresponding e-mail notification (e.g., a quantity of new e-mails received by the e-mail application). Although notification service module 22 did not automatically expand graphical indication 352A, a user may manually expand graphical indication 352A to include a second content portion corresponding to the e-mail notification by providing gesture 356.

Notification service module 22 may receive information from UI module 20 of gesture 356 and determine gesture 356 represents a command from a user to expand graphical indication 352A. FIG. 8B illustrates that, in response to gesture 356, notification service module 22 may expand graphical indication 352A and cause UI module 20 to present graphical indication 352B at UID 12 to include a second content portion corresponding to the e-mail notification.

In some examples, a notification is a summary notification that includes a respective indication of each of a plurality of notifications. In response to determining that the priority level associated with the summary notification satisfies a priority threshold computing device 351 may determine that the content of the summary notification includes a respective first portion of content associated with each of the plurality of notifications, and modify the graphical indication of the summary notification to include the respective first portion of the content associated with each of the plurality of notifications.

For example, the e-mail notification received by notification service module 22 may be an indication of a summary e-mail notification that actually includes content that indicates a plurality of indications of individual e-mail notifications (e.g., notifications of four e-mails received by the e-mail application that generated the notification). Each of the four individual e-mail notifications within the summary e-mail notification may include a respective first and/or second portion of content that computing device 351 can present at UID 12. FIG. 8B shows that after expanding graphical indication 352A of FIG. 8A which corresponds to the first portion of content of the summary e-mail notification, notification service module 22 may cause UI module 20 present graphical indication 352B at UID 12 that include a first portion of content of each of the respective four e-mail notifications.

Figure 9:
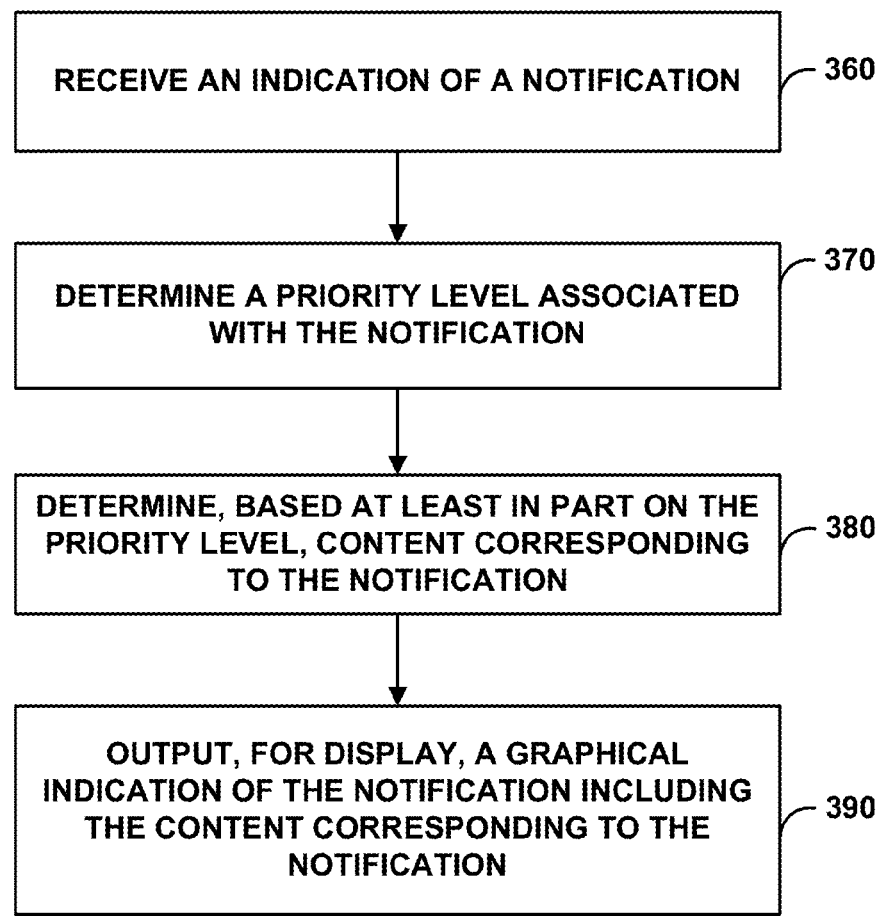
FIG. 9 is a flowchart illustrating further example operations of a computing device, in accordance with one or more aspects of the present disclosure.

FIG. 9 is a flowchart illustrating further example operations of the computing device, in accordance with one or more aspects of the present disclosure. The process of FIG. 9 may be performed by one or more processors of a computing device, such as computing device 10 illustrated in FIG. 1 and FIG. 2. For purposes of illustration only, FIG. 9 is described below within the context of computing devices 351 of FIGS. 8A through 8C.

In the example of FIG. 9, a computing device may receive an indication of a notification (360). For example, notification service module 22 of computing device 351 may receive a calendar notification or information indicating such (e.g., a message, a flag, etc. that indicates to notification service module 22 that the calendar application has generated a notification), from a calendar application executing at computing device 351.

In the example of FIG. 9, the computing device may determine a priority level associated with the notification (370). For example notification service module 22 of computing device 351 may determine that notifications received from the calendar application in general represent high priority notifications. Notification service module 22 may determine the priority level of the calendar notification is high (e.g., having a value ten).

In the example of FIG. 9, the computing device may determine, based at least in part on the priority level, content corresponding to the notification (380). For example notification service module 22 of computing device 351 may determine the priority level associated with the calendar notification satisfies a priority threshold. In response to determining that the priority level associated with the calendar notification satisfies the priority threshold, notification service module 22 may determine the content corresponding to the calendar notification includes both a first portion of content corresponding to the calendar notification (e.g., a clock icon, text of the calendar notification, etc.) and a second content portion corresponding to the calendar notification (e.g., one or more selectable graphical elements for performing a function related to the notification).

In the example of FIG. 9, the computing device may output, for display, a graphical indication of the notification including the content corresponding to the notification (390). For example, notification service module 22 may cause UI module 20 to present a notification center graphical user interface at UID 12. Notification service module 22 may cause UI module 20 to present graphical indication 352A including both the first and second content portions of the calendar notification within graphical indication 352A. In this way, computing device 351 may automatically presents expanded graphical indications of high priority notifications and collapsed graphical indications of low priority notifications.

In some examples, the operations may include receiving, by a computing device, an indication of a notification, determining, by the computing device, a priority level associated with the notification, and determining, by the computing device and based at least in part on the priority level, content of the notification. Responsive to receiving an indication of a gesture detected at an input device, the operations may further include outputting, by the computing device and for display, a notification center graphical user interface, the notification center graphical user interface including a graphical indication of the notification, the graphical indication including the content of the notification.

Responsive to determining that the priority level associated with the notification does not satisfy a priority threshold, the operations may further include determining, by the computing device, to output only a first portion of the content of the notification. Responsive to determining that the priority level associated with the notification satisfies a priority threshold, the operations may further include determining, by the computing device, to output both a first portion and a second portion of the content of the notification.

In some examples, the notification may be a summary notification that includes respective indications of each of a plurality of notifications. Responsive to determining that the priority level associated with at least one of the plurality of notifications satisfies a priority threshold, the operations may include determining, by the computing device, that the content of the summary notification includes a respective first portion of content associated with each of the plurality of notifications, and modifying, by the computing device, the graphical indication of the summary notification to include the respective first portion of the content associated with each of the plurality of notifications.

In some examples, responsive to determining that the priority level associated with the notification satisfies a priority threshold, the operations may include outputting, by the computing device and for display, the graphical indication of the notification within an upper portion of the notification center graphical user interface. In some examples the operations may include outputting, by the computing device and for display at a presence-sensitive screen, the notification center graphical user interface, wherein the presence-sensitive screen includes the input device, and wherein the gesture is detected at the presence-sensitive screen.

In some examples, the operations may include receiving, by a computing device, an indication of a first notification and an indication of a second notification, determining, by the computing device, a respective priority level associated with each of the first and second notifications, and determining, by the computing device and based on the respective priority levels of the first and second notifications, respective content of each of the first and second notifications. The operations may further include outputting, by the computing device and for display, a notification center graphical user interface including a respective graphical indication of each of the first and second notifications, the graphical indication of the first notification including the content of the first notification and the graphical indication of the second notification including the content of the second notification.

In some examples, responsive to determining that the respective priority level of the first notification exceeds the respective priority level of the second notification, the operations may include outputting, by the computing device, for display within the notification center graphical user interface, the graphical indication of the second notification below the graphical indication of the first notification. In some examples, the graphical indication of the first notification may include both a first content portion and a second content portion of the first notification and the graphical indication of the second notification may include only a first content portion of the second notification.

In some examples, the operations may include receiving, by the computing device, an indication of an input detected at an input device, the input corresponding to a command to clear the first notification, and responsive to receiving the input, ceasing outputting, by the computing device and for display, the graphical indication of the first notification. The operations may further include modifying, by the computing device, the graphical indication of the second notification to include a second content portion of the second notification in addition to the first content portion.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a computing device, a first portion of text-based content of a first notification and a second portion of text-based content of the first notification, wherein the first notification is one of one or more notifications received by the computing device;
   responsive to determining that a priority level associated with the first notification does not satisfy a first priority threshold, outputting, by the computing device, for display within a first graphical indication of the first notification, the first portion of text-based content associated with the first notification and not the second portion of text-based content associated with the first notification, wherein the first priority threshold is based on a highest value priority level associated with the one or more notifications, other than the first notification, for which a respective graphical indication is included within the notification center graphical user interface;
   receiving, by the computing device, an indication of a gesture detected at an input device, the gesture corresponding to a command to clear a second notification from the one or more notifications other than the first notification, the second notification having a higher priority level associated with the second notification than the priority level associated with the first notification;
   and after clearing the second notification, determining, by the computing device, a second priority threshold, wherein the second priority threshold is based on a highest value priority level associated with a subset of the one or more notifications other than the first notification, wherein the subset excludes the second notification; and
   responsive to determining that the priority level associated with the first notification satisfies the second priority threshold, outputting, by the computing device, for display within a second graphical indication of the first notification that replaces the first graphical indication of the first notification, the second portion of text-based content associated with the first notification in addition to the first portion of text-based content associated with the first notification, wherein the second graphical indication of the first notification is larger in size than the first graphical indication of the first notification.

2. The method of claim 1, further comprising:
   responsive to receiving the gesture and responsive to determining that the priority level associated with the first notification satisfies the second priority threshold, outputting, by the computing device, for display and within an upper portion of the notification center graphical user interface, the second graphical indication of the first notification.

3. The method of claim 1, further comprising:
   outputting, by the computing device, for display at a presence-sensitive screen, a notification center graphical user interface, wherein the first and second graphical indications of the first notification are output for display within the notification center graphical user interface.

4. A system comprising:
   a display device;
   an input device;
   at least one processor; and
   at least one module operable by the at least one processor to:
      determine a first portion of text-based content of the first notification and a second portion of text-based content of the first notification, wherein the first notification is one of one or more notifications received by the computing device;
      responsive to determining that a priority level associated with the first notification does not satisfy a first priority threshold, output, for display at the display device within a first graphical indication of the first notification, the first portion of text-based content associated with the first notification and not the second portion of text-based content associated with the first notification, wherein the first priority threshold is based on a highest value priority level associated with the one or more notifications, other than the first notification, for which a respective graphical indication is included within the notification center graphical user interface;
      receive an indication of a gesture detected at the input device, the gesture corresponding to a command to clear a second notification from the one or more notifications other than the first notification, the second notification having a higher priority level associated with the second notification than a priority level associated with the first notification; and after clearing the second notification, determine a second priority threshold, wherein the second priority threshold is based on a highest value priority level associated with a subset of the one or more notifications other than the first notification, wherein the subset excludes the second notification; and responsive to determining that the priority level associated with the first notification satisfies the second priority threshold, output, for display at the display device and within a second graphical indication of the first notification that replaces the first graphical indication of the first notification, the second portion of text-based content of the first notification in addition to the first portion of text-based content of the first notification, wherein the second graphical indication of the first notification is larger in size than the first graphical indication of the first notification.

5. The system of claim 4, further comprising a presence-sensitive screen that includes the display device and the input device.

6. The system of claim 4, wherein the at least one module is further operable by the at least one processor to:

responsive to receiving the gesture and responsive to determining that the priority level associated with the first notification satisfies the second priority threshold, output, for display at the display device and within an upper portion of the notification center graphical user interface, the second graphical indication of the first notification.

7. The method of claim 1, wherein the input device comprises a presence-sensitive screen and the first graphical indication of the first notification is output for display at a first region of the presence-sensitive screen, the method further comprising prior to receiving the indication of the gesture, outputting, for display, at a second region of the presence-sensitive screen, a graphical indication of the second notification, wherein the gesture is detected at a location of the presence-sensitive screen that corresponds to the second region.

8. The method of claim 7, wherein the first and second regions are non-overlapping regions of the presence-sensitive screen.

9. The method of claim 1, wherein the second priority threshold is determined prior to receiving any additional indications of gestures detected at the input device.

10. The system of claim 4, wherein the second priority threshold is determined prior to receiving any additional indications of gestures detected at the input device.

11. The system of claim 5, wherein the first graphical indication of the first notification is output for display at a first region of the presence-sensitive screen and the at least one module is further operable by the at least one processor to:

prior to receiving the indication of the gesture, output, for display, a graphical indication of the second notification at a second region of the presence-sensitive screen, wherein the gesture is detected at a location of the presence-sensitive screen that corresponds to the second region.

12. The system of claim 11, wherein the first and second regions are non-overlapping regions of the presence-sensitive screen.

* * * * *